(12) United States Patent
Panwar et al.

(10) Patent No.: US 12,741,572 B2
(45) Date of Patent: Sep. 22, 2026

(54) ACTIVE VEHICLE SEAT WITH SPRING-SUPPORTED MORPHING PORTIONS

(71) Applicant: Toyota Motor Engineering & Manufacturing North America, Inc., Plano, TX (US)

(72) Inventors: Shardul Singh Panwar, Ann Arbor, MI (US); Umesh N. Gandhi, Farmington Hills, MI (US); Brian J. Pinkelman, Ann Arbor, MI (US); Ryohei Tsuruta, Ann Arbor, MI (US); Mark A. Gummin, Silverton, OR (US); Eric D. Smith, Northville, MI (US); Mark E. Smith, Fenton, MI (US)

(73) Assignees: MIGA Technologies LLC, Silverton, OR (US); Toyota Motor Engineering & Manufacturing North America, Inc., Plano, TX (US)

( * ) Notice: Subject to any disclaimer, the term of this patent is extended or adjusted under 35 U.S.C. 154(b) by 348 days.

(21) Appl. No.: 17/553,990

(22) Filed: Dec. 17, 2021

(65) Prior Publication Data

US 2023/0191953 A1 Jun. 22, 2023

(51) Int. Cl.
*B60N 2/50* (2006.01)
*B60N 2/02* (2006.01)

(52) U.S. Cl.
CPC ........... *B60N 2/501* (2013.01); *B60N 2/0273* (2023.08); *B60N 2/026* (2023.08); *B60N 2/0268* (2023.08)

(58) Field of Classification Search
None
See application file for complete search history.

(56) References Cited

U.S. PATENT DOCUMENTS 278,787 A 6/1883 Fannin
1,658,669 A 2/1928 Cohn et al.
(Continued)

FOREIGN PATENT DOCUMENTS

CN 201037277 3/2008
CN 101367433 A 2/2009
(Continued)

OTHER PUBLICATIONS

Song et al., "Resistance Modelling of SMA Wire Actuators", Canadian Institute for NDE, International Workshop: Smart Materials, Structures & NDT in Aerospace Conference, Nov. 2011 (10 pages).

(Continued)

*Primary Examiner* — Angela Y Ortiz
*Assistant Examiner* — Torrence S Marunda, II
(74) *Attorney, Agent, or Firm* — Christopher G. Darrow; Darrow Mustafa PC

(57) ABSTRACT

An actuator includes a first hinge assembly and a second hinge assembly. The actuator has a first dimension and a second dimension, the first dimension extending through the hinge assemblies. An outer skin is connected to the hinge assemblies. The outer skin defines a first actuator side, a second actuator side residing opposite the first actuator side, and a cavity. Shape-memory material (SMM) members are connected to the opposed hinge assemblies. At least one spring member is positioned within the cavity and structured to exert forces on the opposed first and second actuator sides tending to urge the sides away from each other along the second dimension. When an input is provided to the SMM members, the SMM members change their configurations and cause the actuator to morph into an activated configuration in which the first dimension decreases and the second dimension changes inversely to the first dimension.

22 Claims, 11 Drawing Sheets

(56) References Cited

U.S. PATENT DOCUMENTS 1,741,109 A 12/1929 Heimerdinger
1,802,904 A 4/1931 Bryant
2,322,755 A 6/1943 Voorhies
2,327,683 A 8/1943 Warner et al.
2,508,804 A 5/1950 Schwindt
2,588,706 A 3/1952 Davis
3,394,631 A 7/1968 Thompson
3,527,487 A 9/1970 Payne
3,706,102 A 12/1972 Grenier
4,063,826 A 12/1977 Riepe
4,244,140 A 1/1981 Kim
4,275,561 A 6/1981 Wang
4,396,220 A 8/1983 Dieckmann et al.
4,498,851 A 2/1985 Kolm et al.
4,522,447 A 6/1985 Snyder et al.
4,541,885 A 9/1985 Caudill, Jr.
4,544,988 A 10/1985 Hochstein
4,553,393 A 11/1985 Ruoff
4,595,338 A 6/1986 Kolm et al.
4,779,852 A 10/1988 Wassell
4,780,062 A 10/1988 Yamada et al.
4,806,815 A 2/1989 Homma
4,811,564 A 3/1989 Palmer
4,834,619 A 5/1989 Walton
4,898,426 A 2/1990 Schulz et al.
4,923,000 A 5/1990 Nelson
4,944,755 A 7/1990 Hennequin et al.
4,955,196 A 9/1990 Lin et al.
4,964,402 A 10/1990 Grim et al.
5,069,219 A 12/1991 Knoblich
5,088,115 A 2/1992 Napolitano
5,127,228 A 7/1992 Swenson
5,129,753 A 7/1992 Wesley et al.
5,176,424 A 1/1993 Tobita et al.
5,250,167 A 10/1993 Adolf et al.
5,255,390 A 10/1993 Gross et al.
5,279,123 A 1/1994 Wechsler et al.
5,319,248 A 6/1994 Endou
5,482,351 A 1/1996 Young et al.
5,488,255 A 1/1996 Sato et al.
5,509,923 A 4/1996 Middleman et al.
5,522,712 A 6/1996 Winn
5,583,844 A 12/1996 Wolf et al.
5,619,177 A 4/1997 Johnson et al.
5,622,482 A 4/1997 Lee
5,662,376 A 9/1997 Breuer et al.
5,678,247 A 10/1997 Vickers
5,686,003 A 11/1997 Ingram et al.
5,747,140 A 5/1998 Heerklotz
5,771,742 A 6/1998 Bokaie et al.
5,846,629 A 12/1998 Gwinn
5,853,005 A 12/1998 Scanlon
5,861,703 A 1/1999 Losinski
6,043,978 A 3/2000 Mody et al.
6,053,553 A 4/2000 Hespelt
6,093,910 A 7/2000 McClintock et al.
6,116,257 A 9/2000 Yokota et al.
6,142,563 A 11/2000 Townsend et al.
6,155,716 A 12/2000 Okamura
6,186,047 B1 2/2001 Baruffaldi
6,227,515 B1 5/2001 Broyles
6,326,707 B1 12/2001 Gummin et al.
6,379,393 B1 4/2002 Mavroidis et al.
6,394,001 B1 5/2002 Giesey et al.
6,404,098 B1 6/2002 Kayama et al.
6,422,010 B1 7/2002 Julien
6,443,524 B1 9/2002 Yu
6,450,725 B1 9/2002 Roth et al.
6,481,799 B1 11/2002 Whalen
6,508,437 B1 1/2003 Davis et al.
6,530,217 B1 3/2003 Yokota et al.
6,546,806 B1 4/2003 Varma
6,591,188 B1 7/2003 Ohler
6,628,522 B2 9/2003 Trautman et al.
6,664,718 B2 12/2003 Perline et al.
6,719,694 B2 4/2004 Weng et al.
6,740,994 B2 5/2004 Lee et al.
6,773,535 B1 8/2004 Wetzel
6,809,462 B2 10/2004 Pelrine et al.
6,896,324 B1 5/2005 Kull et al.
6,910,714 B2 6/2005 Browne et al.
6,912,748 B2 7/2005 VanSickle
6,943,653 B2 9/2005 Hanke et al.
6,972,659 B2 12/2005 von Behrens et al.
6,998,546 B1 2/2006 Schmidt et al.
7,017,345 B2 3/2006 Von Behrens et al.
7,086,322 B2 8/2006 Schulz
7,093,903 B2 8/2006 O'Connor et al.
7,100,990 B2 9/2006 Kimura et al.
7,108,316 B2 9/2006 Barvosa-Carter et al.
7,117,673 B2 10/2006 Szilagyi
7,125,077 B2 10/2006 Frank
7,204,472 B2 4/2007 Jones et al.
7,237,847 B2 7/2007 Hancock et al.
7,256,518 B2 8/2007 Gummin
7,293,836 B2 11/2007 Browne et al.
7,306,187 B2 12/2007 Lavan
7,309,104 B2 12/2007 Browne et al.
7,331,616 B2 2/2008 Brei et al.
7,336,486 B2 2/2008 Mongia
7,350,851 B2 4/2008 Barvosa-Carter et al.
7,364,211 B2 4/2008 Niskanen et al.
7,371,052 B2 5/2008 Koeneman
7,446,450 B2 11/2008 Boland et al.
7,448,678 B2 11/2008 Browne et al.
7,476,224 B2 1/2009 Petrakis
7,478,845 B2 1/2009 Mankame et al.
7,484,735 B2 2/2009 Verbrugge et al.
7,501,607 B2 3/2009 Camm et al.
7,506,937 B2 3/2009 Bequet
7,511,402 B2 3/2009 Ito et al.
7,527,312 B1 5/2009 Cucknell et al.
7,556,313 B2 7/2009 Browne et al.
7,578,661 B2 8/2009 Koeneman
7,594,697 B2 9/2009 Browne et al.
7,619,894 B2 11/2009 Wang et al.
7,661,764 B2 2/2010 Ali et al.
7,669,799 B2 3/2010 Elzey
7,709,995 B2 5/2010 Hanlon et al.
7,717,520 B2 5/2010 Boren et al.
7,729,828 B2 6/2010 Gandhi
7,731,279 B2 6/2010 Asada et al.
7,735,940 B2 6/2010 Chiu
7,756,246 B2 7/2010 Mikami et al.
7,758,121 B2 * 7/2010 Browne ............. B60N 2/42718 297/452.41
7,766,423 B2 8/2010 Alexander et al.
7,770,391 B2 8/2010 Melz
7,814,810 B2 10/2010 Mitteer
7,823,382 B2 11/2010 Ukpai et al.
7,823,972 B2 11/2010 Browne et al.
7,834,527 B2 11/2010 Rivera et al.
7,878,459 B2 2/2011 Mabe et al.
7,883,148 B2 2/2011 Alexander et al.
7,892,630 B1 2/2011 McKnight et al.
7,901,524 B1 3/2011 McKnight et al.
7,905,538 B2 3/2011 Ukpai et al.
7,905,547 B2 3/2011 Lawall et al.
7,909,403 B2 * 3/2011 Lawall ................. B60N 2/4235 297/284.9
7,964,290 B2 6/2011 Mullner et al.
7,965,509 B2 6/2011 Campbell et al.
7,971,296 B2 7/2011 Jansen
7,971,939 B2 7/2011 Fujita et al.
8,016,952 B2 9/2011 Ishida et al.
8,038,215 B2 10/2011 Di Gusto et al.
8,052,112 B2 11/2011 Lawall et al.
8,056,335 B1 11/2011 Brown
8,100,471 B2 1/2012 Lawall et al.
8,109,567 B2 2/2012 Alexander et al.
8,126,615 B2 2/2012 McMillen et al.
8,172,458 B2 5/2012 Petrakis
8,209,976 B2 7/2012 Vaidyanathan et al.
8,240,677 B2 8/2012 Browne et al.

(56) References Cited

U.S. PATENT DOCUMENTS 8,313,108 B2 11/2012 Ac et al.
8,362,882 B2 1/2013 Heubel et al.
8,366,057 B2 2/2013 Vos et al.
8,414,366 B2 4/2013 Browne et al.
8,446,475 B2 5/2013 Topliss et al.
8,448,435 B2 5/2013 Gregory et al.
8,510,924 B2 8/2013 Mankame et al.
8,584,456 B1 11/2013 McKnight
8,585,456 B2 11/2013 Canon
8,593,568 B2 11/2013 Topliss et al.
8,649,242 B2 2/2014 Martin et al.
8,681,496 B2 3/2014 Dede
8,695,334 B2 4/2014 Lewis et al.
8,702,120 B2 4/2014 Kalisz et al.
8,706,305 B2 4/2014 Jiang et al.
8,721,557 B2 5/2014 Chen et al.
8,741,076 B2 6/2014 Gao et al.
8,756,933 B2 6/2014 Topliss et al.
8,793,821 B2 8/2014 Fowkes et al.
8,827,709 B1 9/2014 Gurule et al.
8,830,335 B2 9/2014 Topliss et al.
8,853,916 B2 10/2014 Browne et al.
8,880,141 B2 11/2014 Chen
8,881,347 B2 11/2014 Feinstein
8,894,142 B2 11/2014 Alexander et al.
8,912,709 B2 12/2014 Pollock et al.
8,991,769 B2 3/2015 Gandhi
8,998,320 B2 4/2015 Mankame et al.
9,068,561 B2 6/2015 Gondo
9,086,069 B2 7/2015 Dede
9,140,243 B2 9/2015 Gandhi et al.
9,168,814 B2 10/2015 Gandhi
9,171,686 B2 10/2015 Alacqua et al.
9,180,525 B2 11/2015 Park et al.
9,267,495 B2 2/2016 Kopfer et al.
9,298,207 B2 3/2016 Li
9,347,609 B2 5/2016 Pinto, IV et al.
9,428,088 B1 8/2016 Rajasingham
9,457,813 B2 10/2016 Hoerwick et al.
9,457,887 B2 10/2016 Roe et al.
9,495,875 B2 11/2016 Dowdall et al.
9,512,829 B2 12/2016 Alacqua et al.
9,550,466 B2 1/2017 Gandhi
9,588,020 B2 3/2017 Browne et al.
9,662,197 B2 5/2017 Yun et al.
9,664,182 B2 5/2017 Nicolini et al.
9,664,210 B2 5/2017 Ou et al.
9,684,183 B2 6/2017 Brown et al.
9,696,175 B2 7/2017 Hansen et al.
9,697,708 B2 7/2017 Adrezin et al.
9,714,460 B2 7/2017 Merideth
9,719,534 B2 8/2017 Shevchenko et al.
9,731,828 B2 8/2017 Lichota
9,764,220 B2 9/2017 Keating et al.
9,784,249 B2 10/2017 Li et al.
9,784,590 B2 10/2017 Englehardt et al.
9,827,888 B2 11/2017 Patrick et al.
9,848,814 B2 12/2017 Benson et al.
9,943,437 B2 4/2018 Lowe et al.
9,945,490 B2 * 4/2018 Dankbaar ........... F03G 7/06143
9,981,421 B2 5/2018 Macroe et al.
9,994,136 B2 6/2018 Nakada
10,007,263 B1 6/2018 Fields et al.
10,029,618 B2 7/2018 Perez Astudillo et al.
10,059,334 B1 8/2018 Zhu et al.
10,061,350 B2 8/2018 Magi
10,066,829 B2 9/2018 Wong et al.
10,168,782 B1 1/2019 Tchon et al.
10,191,550 B1 1/2019 Nussbaum et al.
10,208,823 B2 2/2019 Kashani
10,299,520 B1 5/2019 Shaffer et al.
10,302,586 B2 5/2019 Sun et al.
10,315,771 B1 6/2019 Rao et al.
10,330,144 B1 6/2019 Alqasimi et al.
10,330,400 B2 6/2019 Dede
10,335,044 B2 7/2019 Banet et al.
10,349,543 B2 7/2019 Sreetharan et al.
10,355,624 B2 7/2019 Majdi et al.
10,371,229 B2 8/2019 Gandhi et al.
10,371,299 B2 8/2019 Leffler
10,377,278 B2 8/2019 Ketels et al.
10,427,634 B2 10/2019 Gandhi et al.
10,434,973 B2 10/2019 Gandhi et al.
10,441,491 B2 10/2019 Wyatt et al.
10,459,475 B2 10/2019 Gandhi et al.
10,479,246 B2 11/2019 Meingast et al.
10,532,672 B1 1/2020 Pinkelman et al.
10,576,859 B2 3/2020 Gao et al.
10,583,757 B2 3/2020 Ketels et al.
10,591,078 B2 3/2020 Oehler et al.
10,647,237 B2 5/2020 Song
10,677,310 B2 6/2020 Gandhi et al.
10,682,931 B2 6/2020 Rowe et al.
10,724,595 B2 7/2020 Citro et al.
10,759,320 B2 * 9/2020 Mochizuki ............... B60N 2/02
10,773,487 B2 9/2020 Frigerio et al.
10,781,800 B2 9/2020 Browne et al.
10,814,514 B2 10/2020 Aihara
10,843,611 B2 11/2020 Caruss et al.
10,933,974 B2 3/2021 Tsuruta et al.
10,960,793 B2 3/2021 Gandhi et al.
10,965,172 B2 3/2021 Dede et al.
10,993,526 B2 5/2021 Vandewall et al.
10,995,779 B2 5/2021 Keplinger et al.
11,048,329 B1 6/2021 Lee et al.
11,091,060 B2 8/2021 Pinkelman et al.
11,125,248 B2 9/2021 Joshi et al.
11,137,045 B2 10/2021 Gandhi et al.
11,180,052 B2 11/2021 Severgnini et al.
11,215,170 B2 1/2022 Zamani et al.
11,241,842 B2 2/2022 Gandhi et al.
11,247,584 B2 * 2/2022 Breitweg ............. B60N 2/0248
11,248,592 B1 2/2022 Tsuruta et al.
11,269,891 B2 3/2022 Frank et al.
11,285,844 B2 3/2022 Gandhi et al.
11,353,009 B1 6/2022 Rowe et al.
11,356,255 B1 6/2022 Emelyanov et al.
11,370,330 B2 6/2022 Gandhi et al.
11,372,481 B2 6/2022 Leroy et al.
11,377,007 B2 7/2022 Samain et al.
11,421,664 B1 8/2022 Rowe et al.
11,458,874 B2 10/2022 Nagai et al.
11,460,009 B1 10/2022 Tsuruta et al.
11,460,010 B1 10/2022 Tsuruta et al.
11,467,669 B2 10/2022 Liu et al.
11,472,325 B1 10/2022 Tsuruta et al.
11,486,421 B2 11/2022 Keplinger et al.
11,536,255 B1 12/2022 Rowe
11,541,820 B2 1/2023 Rea et al.
11,542,925 B1 1/2023 Rowe et al.
11,577,471 B2 2/2023 Gandhi et al.
11,585,128 B2 2/2023 Ketels et al.
11,591,076 B2 2/2023 Song et al.
11,592,010 B1 2/2023 Panwar et al.
11,592,037 B1 2/2023 Rowe et al.
11,603,153 B1 3/2023 Trager et al.
11,603,828 B2 3/2023 Gummin et al.
11,624,376 B2 4/2023 Rowe et al.
11,628,898 B1 4/2023 Trager et al.
11,642,083 B2 5/2023 Severgnini et al.
11,649,808 B2 5/2023 Tsuruta et al.
11,668,287 B2 6/2023 Naly et al.
11,680,559 B1 6/2023 Rowe et al.
11,702,015 B2 7/2023 Pinkelman et al.
11,732,735 B2 8/2023 Song et al.
11,750,115 B2 9/2023 Saneyoshi et al.
11,752,901 B2 9/2023 Gandhi et al.
11,795,924 B2 10/2023 Rowe
11,840,161 B2 12/2023 Schmalenberg et al.
11,841,008 B1 12/2023 Panwar et al.
11,885,428 B2 1/2024 Panwar et al.
11,897,379 B2 2/2024 Tsuruta et al.
11,913,436 B2 2/2024 Easton et al.
11,927,206 B2 3/2024 Rowe et al.

(56) References Cited

U.S. PATENT DOCUMENTS

2002/0113499 A1 8/2002 Von et al.
2002/0130754 A1 9/2002 Alacqua et al.
2002/0179663 A1 12/2002 Moore et al.
2002/0185932 A1 12/2002 Gummin et al.
2003/0000605 A1 1/2003 Homma
2003/0182041 A1 9/2003 Watson
2004/0035108 A1 2/2004 Szilagyi
2004/0041998 A1 3/2004 Haddad
2004/0104580 A1 6/2004 Spiessl et al.
2004/0118854 A1 6/2004 Kutun
2004/0145230 A1 7/2004 Fujita et al.
2004/0195888 A1 10/2004 Frye
2004/0256920 A1 12/2004 Gummin et al.
2004/0261411 A1 12/2004 MacGregor
2005/0023086 A1 2/2005 Szilagyi
2005/0066810 A1 3/2005 Schulz
2005/0082897 A1 4/2005 Ropp et al.
2005/0111177 A1 5/2005 Kwitek
2005/0146147 A1 7/2005 Niskanen et al.
2005/0198904 A1 9/2005 Browne et al.
2005/0199455 A1 9/2005 Browne et al.
2005/0199845 A1 9/2005 Jones et al.
2005/0206096 A1 9/2005 Browne et al.
2005/0210874 A1 9/2005 Browne et al.
2005/0211198 A1 9/2005 Froeschle et al.
2005/0227607 A1 10/2005 Stevenson et al.
2005/0253425 A1 11/2005 Asada et al.
2006/0033312 A1 2/2006 Barvosa-Carter et al.
2006/0038643 A1 2/2006 Xu et al.
2006/0038745 A1 2/2006 Naksen et al.
2006/0074325 A1 4/2006 Karo et al.
2006/0201149 A1 9/2006 Biggs et al.
2006/0223637 A1 10/2006 Rosenberg
2006/0226013 A1 10/2006 Decre et al.
2006/0244293 A1 11/2006 Buffa
2006/0265965 A1 11/2006 Butera et al.
2007/0025575 A1 2/2007 Oser et al.
2007/0046074 A1 3/2007 Satta et al.
2007/0063566 A1 3/2007 Browne et al.
2007/0084220 A1 4/2007 Asada et al.
2007/0188004 A1 8/2007 Browne et al.
2007/0205853 A1 9/2007 Taya et al.
2007/0209213 A1 9/2007 Chorpash
2007/0236071 A1 10/2007 Fujita et al.
2007/0246285 A1 10/2007 Browne et al.
2007/0246898 A1 10/2007 Keefe et al.
2007/0246979 A1 10/2007 Browne et al.
2007/0271939 A1 11/2007 Ichigaya
2007/0277877 A1 12/2007 Ghorbal et al.
2008/0006353 A1 1/2008 Elzey et al.
2008/0010912 A1 1/2008 Hanson et al.
2008/0018198 A1 1/2008 Sohn et al.
2008/0085436 A1 4/2008 Langan et al.
2008/0100118 A1 5/2008 Young et al.
2008/0114218 A1 5/2008 Suyama et al.
2008/0219501 A1 9/2008 Matsumoto
2008/0267770 A1 10/2008 Webster et al.
2008/0271559 A1 11/2008 Garscha et al.
2008/0272259 A1 11/2008 Zavattieri et al.
2008/0307786 A1 12/2008 Hafez et al.
2009/0008973 A1 1/2009 Browne
2009/0009656 A1 1/2009 Honda et al.
2009/0030576 A1 1/2009 Periot et al.
2009/0041085 A1 2/2009 Petrakis
2009/0074993 A1* 3/2009 Gao ...................... B60J 1/2033 160/310
2009/0108607 A1 4/2009 Browne et al.
2009/0115284 A1 5/2009 Liang et al.
2009/0131752 A1 5/2009 Park
2009/0143730 A1 6/2009 De Polo et al.
2009/0173305 A1 7/2009 Alexander et al.
2009/0212158 A1 8/2009 Mabe et al.
2009/0218858 A1 9/2009 Lawall et al.
2009/0224584 A1 9/2009 Lawall et al.
2009/0224587 A1 9/2009 Lawall et al.
2009/0241537 A1 10/2009 Browne et al.
2009/0242285 A1 10/2009 Whetstone, Jr.
2009/0283643 A1 11/2009 Sar et al.
2009/0284059 A1 11/2009 Gupta et al.
2010/0001568 A1 1/2010 Trybus et al.
2010/0027119 A1 2/2010 Kollar et al.
2010/0031525 A1 2/2010 Allezy et al.
2010/0036567 A1 2/2010 Gandhi
2010/0066142 A1 3/2010 Gross et al.
2010/0117663 A1 5/2010 Herrera et al.
2010/0192567 A1 8/2010 Butera
2010/0212312 A1 8/2010 Rudduck
2010/0221124 A1 9/2010 Ikushima et al.
2010/0244505 A1 9/2010 Demick et al.
2010/0275592 A1 11/2010 Topliss et al.
2010/0282902 A1 11/2010 Rajasingham
2010/0287965 A1 11/2010 Bryant
2010/0294476 A1 11/2010 Gomi et al.
2010/0308689 A1 12/2010 Rahman et al.
2010/0326070 A1 12/2010 Hao et al.
2011/0004346 A1 1/2011 Jiang et al.
2011/0017103 A1 1/2011 Lee
2011/0021932 A1 1/2011 Kim et al.
2011/0030380 A1 2/2011 Widdle, Jr. et al.
2011/0038727 A1 2/2011 Vos et al.
2011/0111839 A1 5/2011 Lesley et al.
2011/0120119 A1 5/2011 Alexander et al.
2011/0150669 A1 6/2011 Frayne et al.
2011/0179786 A1 7/2011 Topliss et al.
2011/0179790 A1 7/2011 Pretorius
2011/0217031 A1 9/2011 Eromaki
2011/0300358 A1 12/2011 Blohowiak et al.
2012/0019216 A1 1/2012 Lewis et al.
2012/0049095 A1 3/2012 Yamasaki
2012/0056459 A1 3/2012 Harden
2012/0081337 A1 4/2012 Camp, Jr. et al.
2012/0109025 A1 5/2012 Weinberg et al.
2012/0136126 A1 5/2012 Rousseau
2012/0181896 A1 7/2012 Kornbluh et al.
2012/0232783 A1 9/2012 Calkins et al.
2012/0237309 A1 9/2012 Park et al.
2012/0239183 A1 9/2012 Mankame et al.
2012/0267928 A1 10/2012 Mankame et al.
2012/0276807 A1 11/2012 Cabrera
2012/0292155 A1 11/2012 Gunter
2012/0297763 A1 11/2012 Mankame et al.
2012/0319445 A1 12/2012 Zolno et al.
2013/0005442 A1 1/2013 Erickson et al.
2013/0011806 A1 1/2013 Gao et al.
2013/0043354 A1 2/2013 Shome et al.
2013/0075210 A1 3/2013 Langbein et al.
2013/0098029 A1 4/2013 Pinto, IV et al.
2013/0188313 A1 7/2013 Dede
2013/0205770 A1 8/2013 Browne et al.
2013/0227943 A1 9/2013 Mance et al.
2014/0130491 A1 5/2014 Gandhi et al.
2014/0168894 A1 6/2014 Dede
2014/0196633 A1 7/2014 Shaw
2014/0207333 A1 7/2014 Vandivier et al.
2014/0210240 A1 7/2014 Muck et al.
2014/0217792 A1 8/2014 Meyer
2014/0239677 A1 8/2014 Laib et al.
2014/0250881 A1 9/2014 Yamamoto
2014/0265468 A1 9/2014 Greenhill et al.
2014/0265479 A1 9/2014 Bennett
2014/0277739 A1 9/2014 Kornbluh et al.
2014/0298794 A1 10/2014 Flaschentrager et al.
2014/0314976 A1 10/2014 Niiyama et al.
2014/0316269 A1 10/2014 Zhang et al.
2014/0333088 A1 11/2014 Lang et al.
2014/0338324 A1 11/2014 Jasklowski
2015/0016968 A1 1/2015 Grabowska et al.
2015/0114270 A1 4/2015 Tsuchida
2015/0130220 A1 5/2015 Preisler et al.
2015/0185764 A1 7/2015 Magi
2015/0197173 A1 7/2015 Hulway
2015/0202993 A1* 7/2015 Mankame ............ B60N 2/0284 297/284.4
2015/0274078 A1 10/2015 Alacqua et al.

(56) References Cited

U.S. PATENT DOCUMENTS

2015/0289994 A1 10/2015 Engeberg et al.
2015/0290015 A1 10/2015 Elahinia et al.
2015/0331488 A1 11/2015 Grant et al.
2015/0366350 A1 12/2015 DiCenso et al.
2016/0004298 A1 1/2016 Mazed et al.
2016/0032997 A1 2/2016 Seepersad et al.
2016/0061345 A1 3/2016 Jackson, Jr.
2016/0082984 A1 3/2016 Schmidt
2016/0084665 A1 3/2016 Englehardt et al.
2016/0123793 A1 5/2016 Kollich et al.
2016/0169213 A1 6/2016 Calkins et al.
2016/0221475 A1 8/2016 Sugiyama
2016/0246374 A1 8/2016 Carter et al.
2016/0278459 A1 9/2016 Hilty
2016/0325837 A1 11/2016 Erhel et al.
2016/0339801 A1 11/2016 Pereny et al.
2016/0345088 A1 11/2016 Vilermo et al.
2016/0375459 A1 12/2016 deVilliers et al.
2016/0375835 A1 12/2016 Murray et al.
2017/0116792 A1 4/2017 Jelinek et al.
2017/0121068 A1 5/2017 Foshansky et al.
2017/0123499 A1 5/2017 Eid
2017/0148102 A1 5/2017 Franke et al.
2017/0153707 A1 6/2017 Subramanian et al.
2017/0158104 A1 6/2017 Le et al.
2017/0166222 A1 6/2017 James
2017/0174236 A1 6/2017 Worden et al.
2017/0203432 A1 7/2017 Andrianesis
2017/0240075 A1 8/2017 McCoy et al.
2017/0252260 A1 9/2017 Gummin et al.
2017/0328384 A1 11/2017 Goto et al.
2017/0355288 A1 12/2017 Barbat et al.
2017/0361733 A1 12/2017 Gage
2018/0001113 A1 1/2018 Streeter
2018/0012433 A1 1/2018 Ricci
2018/0036198 A1 2/2018 Mergl et al.
2018/0073491 A1 3/2018 Gissen et al.
2018/0084915 A1 3/2018 Norman et al.
2018/0111511 A1 4/2018 Lota
2018/0115260 A1 4/2018 Chiba et al.
2018/0130347 A1 5/2018 Ricci et al.
2018/0132825 A1 5/2018 Tachibana
2018/0134191 A1 5/2018 Ketels et al.
2018/0141562 A1 5/2018 Singhal
2018/0148007 A1 5/2018 Gage et al.
2018/0149141 A1 5/2018 Cullen et al.
2018/0151035 A1 5/2018 Maalouf et al.
2018/0178808 A1 6/2018 Zhao et al.
2018/0249772 A1 9/2018 Koo et al.
2018/0251234 A1 9/2018 Wang
2018/0264975 A1 9/2018 Bonk et al.
2018/0281621 A1 10/2018 Kaku et al.
2018/0286189 A1 10/2018 Motamedi et al.
2018/0321703 A1 11/2018 Gandhi et al.
2018/0345841 A1 12/2018 Prokhorov et al.
2018/0348759 A1 12/2018 Freeman et al.
2018/0355991 A1 12/2018 Pfahler
2019/0005272 A1 1/2019 Gault et al.
2019/0023161 A1 1/2019 Sullivan et al.
2019/0039525 A1 2/2019 Hu
2019/0041986 A1 2/2019 Rihn et al.
2019/0042857 A1 2/2019 Endo et al.
2019/0059608 A1 2/2019 Yan et al.
2019/0061307 A1 2/2019 Chen et al.
2019/0083022 A1 3/2019 Huang
2019/0135150 A1 5/2019 Gao et al.
2019/0143869 A1 5/2019 Sequi et al.
2019/0154122 A1 5/2019 Lima et al.
2019/0193615 A1 6/2019 Mankame et al.
2019/0197842 A1 6/2019 Long et al.
2019/0232842 A1 8/2019 Boccuccia et al.
2019/0291649 A1 9/2019 Ito
2020/0010001 A1 1/2020 Pinkelman et al.
2020/0015493 A1 1/2020 Ergun et al.
2020/0015593 A1 1/2020 Norman et al.
2020/0032822 A1 1/2020 Keplinger et al.
2020/0079245 A1 3/2020 Rowe et al.
2020/0088175 A1 3/2020 Li et al.
2020/0112269 A1 4/2020 Taghavi et al.
2020/0179168 A1 6/2020 Kelleher et al.
2020/0197250 A1 6/2020 Wyatt et al.
2020/0223325 A1 7/2020 Pinkelman et al.
2020/0226498 A1 7/2020 Jiwani et al.
2020/0238854 A1 7/2020 Gandhi et al.
2020/0247274 A1 8/2020 Gandhi et al.
2020/0276971 A1 9/2020 Takeda et al.
2020/0282878 A1 9/2020 Gandhi et al.
2020/0298732 A1 9/2020 Gandhi et al.
2020/0307416 A1 10/2020 Gandhi et al.
2020/0309102 A1 10/2020 Henderson et al.
2020/0339242 A1 10/2020 Tsuruta et al.
2020/0377036 A1 12/2020 Lee et al.
2020/0378370 A1 12/2020 Kopfer et al.
2021/0038467 A1 2/2021 Van Der Merwe et al.
2021/0095646 A1 4/2021 Blecha et al.
2021/0114553 A1 4/2021 Awtar et al.
2021/0118597 A1 4/2021 Pinkelman et al.
2021/0132396 A1 5/2021 Shin et al.
2021/0153754 A1 5/2021 Ozawa et al.
2021/0161755 A1 6/2021 Le et al.
2021/0162457 A1 6/2021 Eberfors
2021/0221269 A1 7/2021 Baranowski et al.
2021/0236061 A1 8/2021 Severgnini et al.
2021/0237631 A1 8/2021 Muck et al.
2021/0237809 A1 8/2021 Rowe et al.
2021/0265922 A1 8/2021 Nakagawa
2021/0284079 A1 9/2021 Rowe et al.
2021/0312169 A1 10/2021 Pham
2021/0369547 A1 12/2021 Mau et al.
2021/0370499 A1 12/2021 Rowe et al.
2022/0001530 A1 1/2022 Sameoto et al.
2022/0012458 A1 1/2022 Uetabira
2022/0015932 A1 1/2022 Rowe
2022/0015933 A1 1/2022 Rowe
2022/0015971 A1 1/2022 Rowe et al.
2022/0015977 A1 1/2022 Rowe et al.
2022/0017005 A1 1/2022 Rowe et al.
2022/0021314 A1 1/2022 Rowe et al.
2022/0031178 A1 2/2022 Brulet et al.
2022/0063087 A1 3/2022 Rowe
2022/0106941 A1 4/2022 Easton
2022/0119202 A1 4/2022 Morrissey et al.
2022/0154703 A1 5/2022 Shin et al.
2022/0164079 A1 5/2022 Severgnini et al.
2022/0166351 A1 5/2022 Rowe
2022/0176550 A1 6/2022 Rowe
2022/0176551 A1 6/2022 Rowe et al.
2022/0178414 A1 6/2022 Herzog et al.
2022/0196109 A1 6/2022 Gandhi et al.
2022/0196967 A1 6/2022 Dai et al.
2022/0232903 A1 7/2022 Rutledge et al.
2022/0239238 A1 7/2022 Rowe et al.
2022/0242328 A1 8/2022 Pinkelman et al.
2022/0258656 A1 8/2022 Little
2022/0299016 A1 9/2022 Tsuruta et al.
2022/0307485 A1 9/2022 Gummin et al.
2022/0313420 A1 10/2022 Rowe et al.
2022/0314857 A1 10/2022 Tsuruta et al.
2022/0315147 A1 10/2022 Palaniswamy et al.
2022/0316457 A1 10/2022 Rowe et al.
2022/0316458 A1 10/2022 Tsuruta et al.
2022/0321033 A1 10/2022 Rowe et al.
2022/0321034 A1 10/2022 Ebling et al.
2022/0371474 A1 11/2022 Kaku et al.
2022/0412325 A1 12/2022 Köpfer et al.
2023/0000715 A1 1/2023 Rowe
2023/0001572 A1 1/2023 Rowe et al.
2023/0078040 A1 3/2023 Rowe et al.
2023/0088911 A1 3/2023 Song et al.
2023/0119407 A1 4/2023 Sugiyama et al.
2023/0120436 A1 4/2023 Tsuruta et al.
2023/0124526 A1 4/2023 Tsuruta et al.
2023/0136197 A1 5/2023 Gilmore et al.
2023/0179122 A1 6/2023 Palaniswamy et al.

(56) References Cited

U.S. PATENT DOCUMENTS

| | | | |
|---|---|---|---|
| 2023/0191953 | A1 | 6/2023 | Panwar et al. |
| 2023/0193929 | A1 | 6/2023 | Rowe et al. |
| 2023/0249599 | A1 | 8/2023 | Nicola et al. |
| 2023/0287871 | A1 | 9/2023 | Rowe |
| 2023/0312109 | A1 | 10/2023 | Joshi et al. |
| 2023/0331371 | A1 | 10/2023 | Gupta et al. |
| 2023/0331372 | A1 | 10/2023 | Gupta et al. |
| 2023/0337827 | A1 | 10/2023 | Pinkelman et al. |
| 2024/0060480 | A1 | 2/2024 | Panwar et al. |
| 2024/0097666 | A1 | 3/2024 | Easton et al. |

FOREIGN PATENT DOCUMENTS

| | | | |
|---|---|---|---|
| CN | 101417152 | A | 4/2009 |
| CN | 102333504 | A | 1/2012 |
| CN | 102152309 | B | 11/2012 |
| CN | 103038094 | A | 4/2013 |
| CN | 103147511 | A | 6/2013 |
| CN | 102026842 | B | 7/2013 |
| CN | 103935495 | A | 7/2014 |
| CN | 102765354 | B | 11/2014 |
| CN | 104290617 | A | 1/2015 |
| CN | 204774820 | U | 11/2015 |
| CN | 105517664 | A | 4/2016 |
| CN | 106168523 | A | 11/2016 |
| CN | 107111473 | A | 1/2017 |
| CN | 206029888 | U | 3/2017 |
| CN | 106956254 | A | 7/2017 |
| CN | 105946515 | B | 4/2018 |
| CN | 108100228 | A | 6/2018 |
| CN | 108819806 | A | 11/2018 |
| CN | 106014897 | B | 12/2018 |
| CN | 106956254 | B | 3/2019 |
| CN | 109572966 | A | 4/2019 |
| CN | 209010975 | U | 6/2019 |
| CN | 105003405 | B | 7/2019 |
| CN | 107485536 | B | 1/2020 |
| CN | 112411375 | A | 2/2021 |
| CN | 113119155 | A | 7/2021 |
| CN | 115706489 | A | 2/2023 |
| DE | 19837829 | A1 | 2/2000 |
| DE | 10155119 | B4 | 5/2003 |
| DE | 20309196 | U1 | 11/2003 |
| DE | 10222022 | A1 | 12/2003 |
| DE | 102010021902 | A1 | 12/2011 |
| DE | 102016210214 | A1 | 12/2017 |
| DE | 102019204866 | A1 | 10/2020 |
| DE | 102008021679 | B4 | 1/2021 |
| EP | 1420094 | A1 | 5/2004 |
| EP | 1519055 | A2 | 3/2005 |
| EP | 1904337 | B1 | 10/2010 |
| EP | 2723069 | A1 | 4/2014 |
| EP | 3196484 | A1 | 7/2017 |
| EP | 3858562 | A1 | 8/2021 |
| FR | 3058108 | A1 | 5/2018 |
| JP | S5870892 | U | 5/1983 |
| JP | S61277898 | A | 12/1986 |
| JP | H03276698 | A | 12/1991 |
| JP | H06033895 | A | 6/1994 |
| JP | 09-133069 | A | 5/1997 |
| JP | H09168285 | A | 6/1997 |
| JP | H10337061 | A | 12/1998 |
| JP | 2001293267 | A | 10/2001 |
| JP | 2003276698 | A | 10/2003 |
| JP | 3706899 | B2 | 10/2005 |
| JP | 2006000347 | A | 1/2006 |
| JP | 2006006581 | A | 1/2006 |
| JP | 2006248456 | A | 9/2006 |
| JP | 2008014470 | A | 1/2008 |
| JP | 2008138558 | A | 6/2008 |
| JP | 2008154447 | A | 7/2008 |
| JP | 4273902 | B2 | 6/2009 |
| JP | 2009162233 | A | 7/2009 |
| JP | 2010117457 | A | 5/2010 |
| JP | 4576281 | B2 | 11/2010 |
| JP | 5760241 | | 8/2015 |
| JP | 2017175155 | A | 9/2017 |
| JP | 2018188035 | A | 11/2018 |
| JP | 2019094789 | A | 6/2019 |
| JP | 2019101988 | A | 6/2019 |
| JP | 2019-113578 | A | 7/2019 |
| JP | 2020090181 | A | 6/2020 |
| JP | 2021107221 | A | 7/2021 |
| KR | 19980044089 | U | 9/1998 |
| KR | 20050056526 | A | 6/2005 |
| KR | 1020130005989 | | 1/2013 |
| KR | 101395364 | B1 | 5/2014 |
| KR | 101483560 | B1 | 1/2015 |
| KR | 20170070675 | A | 6/2017 |
| KR | 101861620 | B1 | 4/2018 |
| KR | 1020180074003 | A | 7/2018 |
| KR | 101931791 | B1 | 12/2018 |
| KR | 20210052091 | A | 5/2021 |
| KR | 20210086518 | A | 7/2021 |
| KR | 102298464 | B1 | 9/2021 |
| WO | 9325267 | A1 | 12/1993 |
| WO | 02011648 | A1 | 2/2002 |
| WO | 2005004321 | A1 | 1/2005 |
| WO | 2009079668 | A2 | 6/2009 |
| WO | 2009111362 | A2 | 9/2009 |
| WO | 2011017071 | A2 | 2/2011 |
| WO | 2011111769 | A1 | 9/2011 |
| WO | 2014145018 | A2 | 9/2014 |
| WO | 2014172320 | A1 | 10/2014 |
| WO | 2014191361 | A1 | 12/2014 |
| WO | 2015037600 | A1 | 3/2015 |
| WO | 2015051380 | A2 | 4/2015 |
| WO | 2016017057 | A1 | 2/2016 |
| WO | 2016130719 | A2 | 8/2016 |
| WO | 2017077541 | A1 | 5/2017 |
| WO | 2018080465 | A1 | 5/2018 |
| WO | 2018175741 | A1 | 9/2018 |
| WO | 2019043599 | A1 | 3/2019 |
| WO | 2019097437 | A1 | 5/2019 |
| WO | 2019137048 | A1 | 7/2019 |
| WO | 2019173227 | A1 | 9/2019 |
| WO | 2020110091 | A2 | 6/2020 |
| WO | 2020183360 | A1 | 9/2020 |
| WO | 2020244794 | A1 | 12/2020 |
| WO | 2021118185 | A2 | 6/2021 |
| WO | 2022258952 | A1 | 12/2022 |

OTHER PUBLICATIONS

Rowe et al., U.S. Appl. No. 18/452,602, filed Aug. 21, 2023.

Motzki, “Efficient SMA Actuation—Design and Control Concepts”, Proceedings, vol. 64, No. 1, MDPI, 2020 (9 pages).

Arduino Documentation, “Secrets of Arduino PWM”, last revision May 27, 2024, retrieved from the Internet: <https://docs.arduino.cc/tutorials/generic/secrets-of-arduino-pwm/>, [retrieved Jun. 1, 2024] (13 pages).

Spiess, “#321 7 Sensors tested: Measuring Current with Microcontrollers (Arduino, ESP32, ESP8266)”, uploaded on Apr. 5, 2020 by user “Andreas Spiess” accessible via the Internet: https://www.youtube.com/watch?v=cG8moaufmQs>.

Barbarino et al., “A review on shape memory alloys with applications to morphing aircraft”, Smart Materials and Structures, Apr. 2014 (19 pages).

“HapWRAP: Soft Growing Wearable Haptic Device”, retrieved from the Internet: <https://smartdevicess.createdsites.com>, dated May 27, 2019 (18 pages).

Yilmaz et al., “Detecting Vital Signs with Wearable Wireless Sensors”, Sensors, Dec. 2010 (26 pages).

Choi et al. “Highly conductive, stretchable, and biocompatible Ag—Au core-sheath nanowire composite for wearable and implantable bioelectronics”, Nature Nanotechnology 13, No. 11, 2018 (36 pages).

Gao et al., “Wearable Microfluidic Diaphragm Pressure Sensor for Health and Tactile Touch Monitoring”, Advanced Materials, Oct. 2017 (15 pages).

(56) References Cited

OTHER PUBLICATIONS

Kweon et al., “Wearable high-performance pressure sensors based on three-dimensional electrospun conductive nanofibers”, NPG Asia Materials 2018 (12 pages).
Wang et al. “Monitoring of the central blood pressure waveform via a conformal ultrasonic device”, Nat Biomed Eng, Sep. 2018 (22 pages).
Agharese et al. “hapWRAP: Soft Growing Wearable Haptic Device”, 2018 IEEE International Conference on Robotics and Automation (ICRA), May 2018 (7 pages).
Gao et al., “Fully integrated wearable sensor arrays for multiplexed in situ perspiration analysis”, Nature, Jan. 2016 (30 pages).
Jitosho et al. “Exploiting Bistability for High Force Density Reflexive Gripping”, 2019 International Conference on Robotics and Automation (ICRA), May 2019 (7 pages).
Wikipedia, “Slap bracelet”, retrieved from the Internet: <https://en.wikipedia.org/wiki/Slap_bracelet>, [retrieved Mar. 12, 2021] (2 pages).
Maffiodo et al. “Three-Fingered Gripper with Flexure Hinges Actuated by Shape Memory Alloy Wires”, Int. J. of Automation Technology, vol. 11, No. 3, pp. 355-360, 2017 (6 pages).
Buckner et al. “Roboticizing fabric by integrating functional fibers”, Proceedings of the National Academy of Sciences, Oct. 2020 (10 pages).
Blain, “Refrigerants not required: Flexible metal cooling prototype demonstrates extreme efficiency”, retrieved from the Internet: <https://newatlas.com/shape-memory-alloy-nitinol-heating-cooling/58837/> [retrieved Apr. 1, 2024], dated Mar. 13, 2019 (13 pages).
Taniguchi, “Flexible Artificial Muscle Actuator Using Coiled Shape Memory Alloy Wires”, APCBEE Procedia 7, pp. 54-59, May 2013 (6 pages).
Acome et al., “Hydraulically amplified self-healing electrostatic actuators with muscle-like performance”, Science 359, pp. 61-65, 2018 (5 pages).
Wang et al., “Recent Progress in Artificial Muscles for Interactive Soft Robotics”, Advanced Materials, vol. 33, Issue 19, published Oct. 27, 2020 (48 pages).
Liang et al., “Comparative study of robotic artificial actuators and biological muscle”, Advances in Mechanical Engineering, 2020 (25 pages).
El-Atab et al., “Soft Actuators for Soft Robotic Applications: A Review”, Advanced Intelligent Systems 2020 (37 pages).
Pagoli et al., “Review of soft fluidic actuators: classification and materials modeling analysis”, Smart Materials and Structures, vol. 31, 2021 (31 pages).
Park et al., “A Novel Fabric Muscle Based on Shape Memory Alloy Springs”, Soft Robotics, vol. 7, No. 3, 2020 (11 pages).
Ebay, “Cardboard Dividers 5 Sets 7.5"×10.5"×4" High 12 cell”, retrieved from the Internet: <https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., “Bistable Buckled Beam: Modeling of Actuating Force and Experimental Validations”, Journal of Mechanical Design, 2009 (10 pages).
Cazottes et al., “Design of Actuation for Bistable Structures Using Smart Materials,” Advances in Science and Technology, vol. 54, pp. 287-292, 2008 (1st Page/Abstract only).
Cazottes et al, “Actuation of bistable buckled beams with Macro-Fiber Composites,” IEEE/RSJ International Conference on Intelligent Robots and Systems, pp. 564-569, 2008 (7 pages).
Haines et al., “New Twist on Artificial Muscles,” Proceedings of the National Academy of Sciences, vol. 113, No. 42, pp. 11709-11716, Oct. 18, 2016 (9 pages).
Inoue et al., “High-performance structure of a coil-shaped soft-actuator consisting of polymer threads and carbon nanotube yarns,” AIP Advances 8, 2018, (8 pages).
Abbas et al., “A Physics Based Model for Twisted and Coiled Actuator” 2017 IEEE International Conference on Robotics and Automation (ICRA), pp. 6121-6126, 2017 (6 pages).
Haines et al., “Artificial Muscles from Fishing Line and Sewing Thread” (Supplementary Materials) Science 343, 868, 2014 (36 pages).
Yip et al., “On the Control and Properties of Supercoiled Polymer Artificial Muscles,” IEEE Transactions on Robotics 2017 (11 pages).
alibaba.com, “Hangzhou Phase Change Technology Co., Ltd”, Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, “New to Our Range: A Magnetic Shape Memory Alloy that Converts Magnetic Field Energy into Kinetic Energy,” <retrieved from the Internet: http://www.goodfellowusa.com/corporate/news/US/June-2011/us.htm> [retrieved Jan. 23, 2012] (2 pages).
Goodfellow Corporation, “Magnetic Shape Memory Material”, <retrieved from the Internet: http://www.goodfellowusa.com/larger-quantities/alloys/magnetic-shape-memory-material/> [retrieved Jan. 23, 2012] (3 pages).
Sherrit et al., “Planar Rotary Motor using Ultrasonic Horns”, Proc. SPIE 7981, Sensors and Smart Structures Technologies for Civil, Mechanical, and Aerospace Systems 2011, 79810O, Apr. 13, 2011 (8 pages).
Henry, “Dynamic Actuation Properties of Ni—Mn—Ga Ferromagnetic Shape Memory Alloys”, submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/468,029, filed Sep. 15, 2023.
Zhu et al., U.S. Appl. No. 18/399,075, filed Dec. 28, 2023.
Rowe et al., U.S. Appl. No. 18/178,302, filed Mar. 3, 2023.
Rowe et al., U.S. Appl. No. 18/399,026, filed Dec. 28, 2023.
Pinkelman et al., U.S. Appl. No. 17/729,522, filed Apr. 26, 2022.
Rowe et al., U.S. Appl. No. 18/453,395, filed Aug. 22, 2023.
Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,734, filed Aug. 21, 2023.
Jani et al., “A review of shape memory alloy research, applications, and opportunities”, Elsevier, 2014, pp. 1078-1113 (36 pages).
Tiseo et al., “A Shape Memory Alloy Based Tuneable Dynamic Vibration Absorber for Vibration Tonal Control”, Journal of Theoretical and Applied Mechanics, 2010, pp. 135-153 (19 pages).
Williams et al., “Dynamic modelling of a shape memory alloy adaptive tuned vibration absorber”, Elsevier, Journal of Vibration and Sound, 2005, pp. 211-234 (24 pages).
Araki et al., “Integrated mechanical and material design of quasi-zero-stiffness vibration isolator with superelastic Cu—Al—Mn shape memory alloy bars”, Journal of Sound and Vibration, 2015 (34 pages).
Casciati et al., “Performance of a base isolator with shape memory alloy bars”, Earthquake Engineering and Engineering Vibration, Dec. 2007 (8 pages).
Correa et al., “Mechanical Design of Negative Stiffness Honeycomb Materials”, Integrating Materials and Manufacturing Innovation, 4:10, pp. 1-11, 2015 (11 pages).
Ferguson-Pell, “Seat Cushion Selection”, J. Rehab. Res. Dev., Special Supplement #2, 23(3), pp. 49-73, 1986 (25 pages).
Miga Motor Company, “Miga AdrenaLine—A Space Age Wire,” retrieved from the Internet: <https://migamotors.com/index.php?main_page=product_info&cPath=1&products_id=37>, [retrieved Mar. 26, 2021] (1 page).
Furukawa Techno Material, “Shape Memory Alloys & Super-elastic Alloys,” retrieved from the Internet: <https://www.furukawa-ftm.com/english/nt-e/product.htm>, [retrieved Mar. 26, 2021] (3 pages).
Edragon Technology Corporation, “What is Electrostatic Chuck?” retrieved from the Internet: <https://edragoncorp.weebly.com/what-is-electrostatic-chuck.html>, 2014 (8 pages).
Strittmatter et al., “Intelligent materials in modern production—Current trends for thermal shape memory alloys,” Procedia Manufacturing, vol. 30, pp. 347-356, 2019 (10 pages).

(56) References Cited

OTHER PUBLICATIONS

Shunk, “GM awarded DOE money to research Shape Memory Alloy heat engines,” dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, “Shape Memory Alloy Massage for Seating Surfaces,” dated Jun. 15, 2018, retrieved from the Internet: <https://contest.techbriefs.com/2018/entries/consumer-products/8871> (3 pages).
Stoeckel, “Shape Memory Actuators for Automotive Applications,” Materials & Design. vol. 11, No. 6, pp. 302-307, Dec. 1990 (6 pages).
Katayama et al., “Shape Memory Alloy Wire Actuated Hinge Mechanism for Deploying Segmented Plates,” Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Ou et al., “jamSheets: Thin Interfaces with Tunable Stiffness Enabled by Layer Jamming,” Proceedings of the 8th International Conference on Tangible, Embedded, and Embodied Interaction, 2014 (8 pages).
Ou et al., “aeroMorph—Heat-sealing Inflatable Shape-change Materials for Interaction Design,” Proceedings of the 29th Annual Symposium on User Interface Software and Technology (2016) pp. 121-132 (10 pages).
Zhu et al., U.S. Appl. No. 18/172,637, filed Feb. 22, 2023.
Lee et al. “Long Shape Memory Alloy Tendon-based Soft Robotic Actuators and Implementation as a Soft Gripper” Scientific Reports, Aug. 2, 2019 (12 pages).
Saga et al. “Development of artificial muscle actuator reinforced by Kevlar fiber”, 2002 IEEE International Conference on Industrial Technology, Jan. 2002 (5 pages).
Wu et al., “Effect of Polyurethane Coating on Mechanical Response of Shape Memory Alloy Wires.” Smart Materials and Structures, IOP Science, Sep. 14, 2023, iopscience.iop.org/article/10.1088/1361-665X/acf69c. Accessed Nov. 21, 2025 (11 pages).
JZK “JZK 2 Mm×30 M 98 Ft Plastic-Coated Thin Stainless Steel Wire Rope Cable: Amazon.de: Business, Industry & Science.” Amazon.de, Nov. 11, 2020, www.amazon.de/-/en/Plastic-Coated-Stainless-Sleeves-Picture-Hanging/dp/B08N6837B9. Ace (Year: 2020) (6 pages).
Wikipedia contributors. (Oct. 16, 2022). Swaged sleeve. In Wikipedia, The Free Encyclopedia. Retrieved 14:36, Aug. 14, 2025, from https://en.wikipedia.org/w/index.php?title=Swaged_sleeve&oldid=1116368722 (Year: 2022), (2 pages).

* cited by examiner

ACTIVE VEHICLE SEAT WITH SPRING-SUPPORTED MORPHING PORTIONS

FIELD

Implementations described herein generally relate to responsive vehicle seats, and, more particularly, to vehicle seats with active seat components that include a shape-memory materials.

BACKGROUND

A person's posture is one or many tangible facets of their overall health. Resting in a vehicle seat for long periods of time, such as during long rides in a vehicle or daily commutes, can make maintaining a healthy posture more challenging. Seat bolsters can maintain a fixed shape to offer lateral support to an occupant. Seat bolsters can have a shape which reduces sliding in the seat, to help maintain a healthy posture while the occupant is seated for long periods. Further, seat bolsters can provide resistance against the leg or torso which provides lateral support to occupants during acceleration or tight turns.

SUMMARY

In one or more implementations, an actuator is provided. The actuator may include a first hinge assembly and a second hinge assembly. The actuator may have a first dimension and a second dimension, the first dimension being substantially perpendicular to the second dimension, the first dimension being in a direction that extends through the first hinge assembly and the second hinge assembly. An outer skin may be operatively connected to the first hinge assembly and the second hinge assembly. The outer skin may define a first actuator side, a second actuator side residing opposite the first actuator side, and a cavity. One or more shape-memory material (SMM) members may be operatively connected to the first hinge assembly and the second hinge assembly. The one or more SMM members may be located substantially within the cavity. At least one spring member may be positioned within the cavity and structured to exert forces on the first actuator side and second actuator side tending to urge the first actuator side and second actuator side away from each other along the second dimension. The actuator is configured such that, when an activation input is provided to the one or more SMM members, the one or more SMM members change from a first configuration to a second configuration and cause the actuator to morph into an activated configuration in which the first dimension increases or decreases and the second dimension changes inversely to the first dimension.

In further implementations, a system for active vehicle seat adjustment is provided. The system includes a vehicle seat having a seat surface. The system also includes one or more actuators located within a portion of the vehicle seat. The one or more actuators are operatively positioned relative to the seat surface such that, when activated, the actuator(s) cause the seat surface to morph into an activated configuration. Each of the actuators may include a first hinge assembly and a second hinge assembly. The actuator may have a first dimension and a second dimension, the first dimension being substantially perpendicular to the second dimension, the first dimension being in a direction that extends through the first hinge assembly and the second hinge assembly. Each of the actuators may include an outer skin operatively connected to the first hinge assembly and the second hinge assembly. The outer skin may define a first actuator side and a second actuator side residing opposite the first actuator side. The outer skin may also define a cavity. One or more shape-memory material (SMM) members may be operatively connected to the first hinge assembly and the second hinge assembly. The one or more SMM members may be located substantially within the cavity. At least one spring member may be positioned within the cavity and structured to exert forces on the first actuator side and second actuator side tending to urge the first actuator side and second actuator side away from each other along the second dimension. The actuator may be configured such that, when an activation input is provided to the one or more SMM members, the one or more SMM members change from a first configuration to a second configuration and cause the actuator to morph into an activated configuration in which the first dimension increases or decreases and the second dimension changes inversely to the first dimension.

In further implementations, a method of morphing a portion of a vehicle seat is provided. One or more actuators may be located within the vehicle seat, the one or more actuators being operatively positioned such that, when activated, the one or more actuators cause a portion of the vehicle seat to morph into an activated configuration. The method includes steps of receiving sensor data from one or more sensors on a vehicle and determining, based on the sensor data, whether a seat actuator activation condition is met. The method includes, responsive to determining that the seat actuator activation condition is met, causing one or more actuators to be activated to cause a portion of the vehicle seat to morph into an activated configuration. The one or more actuators may include a first hinge assembly and a second hinge assembly. The actuator has a first dimension and a second dimension. The first dimension may be substantially perpendicular to the second dimension, the first dimension being in a direction that extends through the first hinge assembly and the second hinge assembly. The one or more actuators may also include an outer skin operatively connected to the first hinge assembly and the second hinge assembly, the outer skin defining a first actuator side and a second actuator side residing opposite the first actuator side, the outer skin defining a cavity. One or more shape-memory material (SMM) members may be operatively connected to the first hinge assembly and the second hinge assembly. The one or more SMM members may be located substantially within the cavity. In addition, at least one spring member may be positioned within the cavity and structured to exert forces on the first actuator side and second actuator side tending to urge the first actuator side and second actuator side away from each other along the second dimension.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate exemplary implementations of this disclosure and are therefore not to be considered limiting of its scope. The disclosure may admit to other implementations.

Figures 1A, 1B:
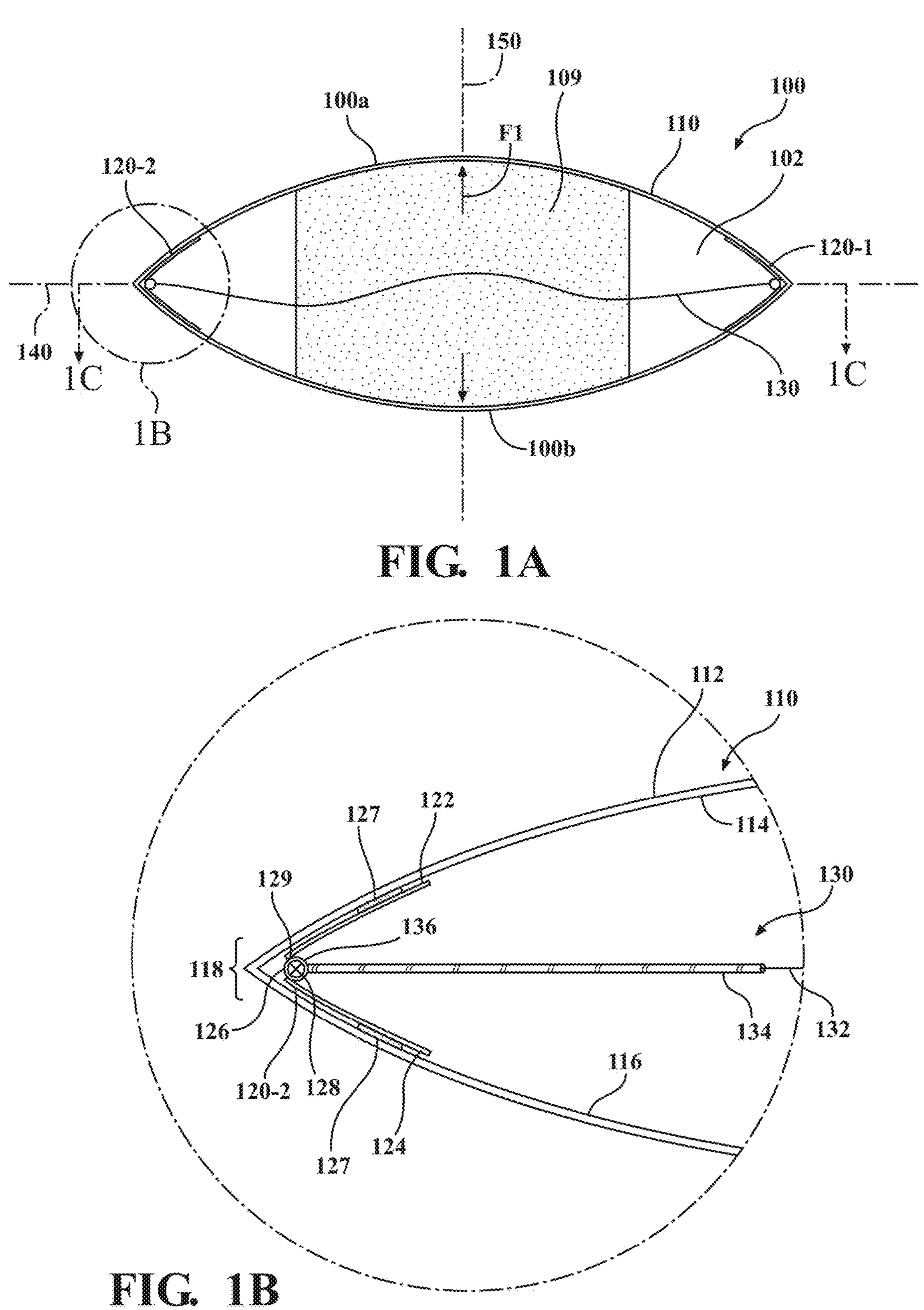
FIG. 1A is a schematic side view of an illustration of an actuator, according to some implementations described herein.
FIG. 1B is a magnified schematic view of a portion of the illustration of the actuator shown in FIG. 1A.

To facilitate understanding, identical reference numerals have been used, wherever possible, to designate identical elements that are common to the figures. Additionally, elements of one or more implementations may be advantageously adapted for utilization in other implementations described herein. Also, in the drawings, elements in different views having the similar reference characters may represent the same or similar elements.

DETAILED DESCRIPTION

Systems and devices described herein relate to actuators that include shape-memory material (SMM) members and seat assemblies which employ such actuators to control the shape and/or position of the seat surface. The SMM members can be SMM wires. SMM wires, as used herein, are wires which include a SMM, such as a wire which is composed of a SMM material. SMMs are a composition which undergoes a reversible transformation in response to a change in temperature or other input.

SMMs can generally include shape-memory alloys (SMA) and shape-memory polymers (SMP). SMAs undergo a thermo-elastic phase transformation in passing from a one phase (e.g., a martensitic phase) to another phase (e.g., an austenitic phase) when heated to a temperature above the phase change transition temperature. Below the phase change transition temperature, the alloy can be readily plastically deformed by as much as a few percent. The SMA remains deformed until heated to or above the phase change transition temperature, at which point the SMA reverts to its original or memory shape. Some SMAs have a resistivity which can be employed for direct heating (e.g., resistive heating by an electric current). As used herein, the phrase "heated to or above the phase change transition temperature" refers to both heating the alloy to a temperature within the phase change transition temperature range or above this range.

The SMM wires are connected to one or more hinge assemblies. The one or more hinge assemblies can connect the SMM wires to an outer skin. As the SMM wires change configuration, the SMM wires exert a force on the hinge assemblies, such as by pulling the same hinge assembly at two different points or by pulling a hinge assembly inward. This force is translated through the hinge assemblies to the outer skin, causing the outer skin to increase or decrease in a first dimension. The change in the first dimension can be inverse to the change in the second dimension of the outer skin. It will be understood that that term "inverse" includes proportional changes as well as non-proportional changes. The outer skin can be operatively positioned with respect to the seat surface of the vehicle seat. Thus, the change in dimensions of the outer skin can be translated to the seat surface of the vehicle seat. Through this translation of force, the resulting action created by the SMM wires leads to a change in shape at the seat surface of the vehicle seat.

The one or more SMM members may be located substantially within the cavity. In addition, at least one spring member may be positioned within the cavity and structured to exert forces on the first actuator side and second actuator side tending to urge the first actuator side and second actuator side away from each other along the second dimension. This may aid in preventing localized deformations of the outer skin due to associated localized applications of force to the outer skin.

The SMM wires can be controlled as part of the system, such as an actuator control system. The actuator control system can receive data, such as sensor data, related to the vehicle and/or the movement of the vehicle affecting the position of the occupants. In one or more implementations, this data can be referred to as a stimulus. As the vehicle moves from one location to another, the movements of the vehicle can be translated to occupants of the vehicle as lateral acceleration. As such, occupants of the vehicle may be jostled or otherwise displaced from the vehicle seat within the cabin of the vehicle. The data received by the actuator control system can be analyzed to determine if the occupant(s) have been displaced or if the occupant(s) will be displaced due to movements of the vehicle. The data can be derived, received, or obtained from one or more sources, such as one or more sensors and/or one or more vehicle systems. The one or more sensors can be positioned or located such that they can detect movement of the vehicle, such as one or more sensors disposed on or in the vehicle.

Once the actuator control system determines that the occupant(s) have been or will be displaced from the vehicle seat, the actuator control system can deliver an input to at least one of the one or more actuators. The actuators can receive the input and apply the input to the SMM wires, such that the SMM wires change in configuration from the first configuration to the second configuration. The input received can be directly delivered to the SMM wires of the actuator (e.g., through heating element or by passing an electrical current to the SMM wires). In further implementations, the input can be received by the actuator as instructions for the actuator to control the SMM wires independently (e.g., a computing device which receives the input and produces a control input for the SMM wires in response).

Among other things, the devices and systems described herein can improve seating comfort, as well as occupant safety. The systems and devices can automatically adjust an occupant support component to a high-support state when needed or desired. For example, when used in a vehicle seat, the present technology can be automated for use during turns, accelerations, periods of high g-forces, or other events where an occupant may benefit from temporary increased lateral support and/or increased firmness of the occupant support component. The use of SMM wires coupled to a hinge provides a light-weight, low-cost approach to adjusting a shape, contour, or position of components, such as occupant support components. This minimizes or removes the requirement for the use of various motors, which minimizes opportunities for mechanical failure. Implementations of the present application can be more clearly understood with relation to the figures and the description below.

Figure 1C:
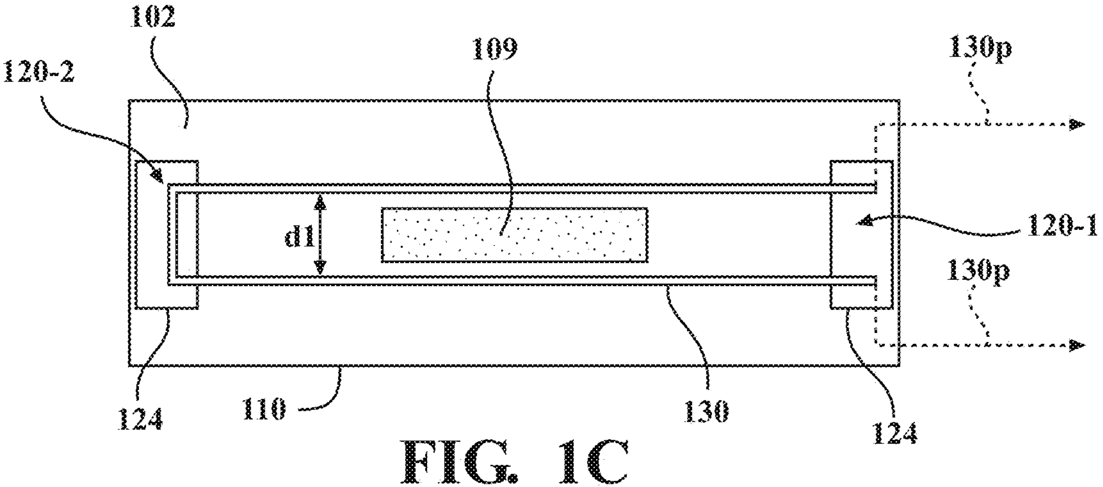
FIG. 1C is a schematic cross-sectional plan view of the actuator embodiment shown in FIGS. 1A and 1B.

FIGS. 1A-1C are illustrations of an exemplary actuator 100, according to some implementations. An embodiment of an actuator described herein can be used as part of a system for active adjustment of one or more portions of a vehicle seat, such as an actuator control system. The actuator 100 can be flexible. The actuator 100 can include an outer skin 110, hinge assemblies 120, and input-responsive element 130. Portions of the outer skin 110 of actuator 100 may be supported as described herein by one or more spring members 109 positioned in an interior cavity of the actuator. The actuator 100 through outer skin 110 can be configured to receive a change in position of the hinge assemblies 120, as created by the input-responsive element 130. The change in shape of the input-responsive element 130, as translated by the outer skin 110, can change the shape of one or more components of the vehicle seat, such as the seat surface. Thus, the actuator 100 can change the shape vehicle seat in response to a stimulus to respond to forces applied to the occupants in the vehicle.

FIG. 1A is a side view of an illustration of the actuator 100, according to some implementations described herein. FIG. 1B is a magnified view of a portion of the illustration of the actuator 100, as shown in FIG. 1A. FIG. 1C is a cross-sectional plan view of the actuator embodiment shown in FIGS. 1A and 1B. In one or more arrangements, the actuator embodiments (and elements thereof) described herein may be similar to embodiments and elements described in commonly-owned U.S. Pat. No. 10,960,793, the disclosure of which is incorporated herein by reference in its entirety.

The exterior of the actuator 100 can substantially comprise the outer skin 110. The outer skin 110 can define the general shape of the actuator 100. The outer skin 110 can be formed from a single piece and/or multiple pieces of one or more materials, such as two (2) or more sheets of a material. Further, the outer skin 110 need not be composed of a uniform material. As such, the outer skin 110 can include one or more materials within a single sheet, one or more materials among multiple sheets, or combinations thereof.

The outer skin 110 can have an exterior surface 112. The exterior surface 112 can form the outermost facing surface of the actuator 100. The outer skin 110 can further include an upper interior surface 114 and a lower interior surface 116. The upper interior surface 114 and the lower interior surface 116 may form an inner surface of the actuator 100 and define a cavity 102. In some implementations, the outer skin 110 can be joined together at an interfacing region 118, thus forming an enclosed version of the cavity 102. In some implementations, the outer skin 110 can act as a support structure for the actuator 100, thus allowing for the general position of the elements contained therein.

The outer skin 110 may define a first actuator side **100*a* and a second actuator side 100*b* residing opposite the first actuator side. The sides 100*a* and 100*b* may be formed by respective portions of the outer skin extending between the hinge assemblies 120 (described below). As described in greater detail below, the actuator 100 may be configured so that the opposed actuator sides 100*a*, 100*b* are movable with respect to each other responsive to changes in length of an SMM wire 132, when an input is provided to the input-responsive element 130**.

The outer skin 110 can be composed of or include a substantially flexible material. "Flexible" refers to the property of the outer skin 110 that can be reversibly deformed, such that the outer skin 110 will not be damaged during the deformation. Damage can include cracking, breaking, fracturing, or other forms of inelastic deformation. As used herein, the term "substantially" includes exactly the term it modifies and slight variations therefrom. Thus, the term "substantially flexible" means the entirety of the element is flexible and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

In some implementations, the flexible material is a flexible polymer. Specific examples of flexible polymers which can be used various implementations include rubber (including natural rubber, styrene-butadiene, polybutadiene, neoprene, ethylene-propylene, butyl, nitrile, silicone), polycarbonates, acrylic, polyesters, polyethylenes, polypropylenes, nylon, polyvinyl chlorides, polystyrenes, elastomers, polyolefins, and others flexible polymers known to persons skilled in the art. In some implementations, the flexible material can be exposed to a degree of stretch selected in the range of about 1% to about 1300%, such as about 10% to about 1300%, or about 100% to about 1300% without resulting in mechanical failure (e.g., tearing, cracking, or inelastic deformation). In further implementations, the flexible material can be deformed to a radius of curvature selected in the range of 100 micrometers (μm) to 3 meters (m) without mechanical failure.

The actuator 100 can further include one or more hinge assemblies 120. The hinge assemblies 120 can have any suitable configuration. The hinge assemblies 120 can be any suitable type of hinge, now known or later developed. In one or more arrangements, the hinge assemblies 120 can include a first attachment member 122, a second attachment member

124, and a hinge joint 126. In some implementations, the hinge joint 126 can form the center of the hinge assemblies 120. The first attachment member 122 can rotate or otherwise move with relation to the second attachment member 124, such as moving about the hinge joint 126. The first attachment member 122 can be substantially similar to the second attachment member 124, a mirror image of the second attachment member 124 about the hinge joint 126, or others. The first attachment member 122 and the second attachment member 124 can be of any primary shape or combinations of shapes. As well, the first attachment member 122 can include one or more shapes, sizes, or components which are different from the second attachment member 124. For purposes of description in FIGS. 1A-1C, a first one of hinge assemblies 120 is labeled 120-1 along a first edge of the actuator and a second one of hinge assemblies 120 is labeled 120-2 along an opposite edge of the actuator.

The first attachment member 122 can be operatively connected to the upper interior surface 114 of the actuator 100. Conversely, the second attachment member 124 can be operatively connected to the lower interior surface 116 of the actuator 100. In some implementations, the first attachment member 122 and/or the second attachment member 124 can be directly or indirectly attached to the upper interior surface 114 and/or the lower interior surface 116, respectively. In further implementations, the first attachment member 122 is connected to the upper interior surface 114 via a connection element 127. The connection element 127 can be one or more components which cause the first attachment member 122 to attach to the upper interior surface 114, such as an adhesive(s), fastener(s), and/or mechanical engagement(s).

As used herein, the terms "operatively connected" and/or "operative connection" generally refer to any form of connection or association capable of being formed between two or more elements, in light of the functions and/or operations described in the implementations disclosed herein. In one or more implementations, "operatively connected" can include any form of direct and indirect connections, including connections without direct physical contact. Elements which are described herein as "operatively connected" can, in one or more implementations, be more specifically described as "directly connected", "indirectly connected", "connected", "fluidly connected", "mechanically connected", "electrically connected", "fixably connected", "transiently connected", other forms of connection, or combinations of the above connections, as appropriate for the elements being described. In further implementations, prepositions such as "to," "with," "between," "in parallel," "in series," or combinations thereof, can be added to more clearly describe the organization of the operative connections described herein or exchanged to discuss alternative implementations. Furthermore, "operatively connected" can include unitary physical structures, that is, structures formed from a single piece of material (e.g., by casting, stamping, machining, three-dimensional printing, etc.). All permutations of operative connections described here are expressly contemplated for one or more implementations of this disclosure without further explicit recitation herein.

The first attachment member 122 and the second attachment member 124 can be formed from a material such that the first attachment member 122 and the second attachment member 124 can deform, bend, and/or displace the outer skin 110 in response to an applied force. In some implementations, the first attachment member 122 and/or the second attachment member 124 can be formed from a metallic material, such as, for example, steel, aluminum, brass, or others. In further implementations, the first attachment member 122 and/or the second attachment member 124 can be formed from a rigid or semi-rigid material, such as a plastic (e.g., Acrylonitrile butadiene styrene (ABS)). The first attachment member 122 and/or the second attachment member 124 can be sized, shaped, and/or configured to support the outer skin 110 and/or to apply for a desired level of force.

The hinge joint 126 can provide mobility or flexibility to the first attachment member 122 and the second attachment member 124 with respect to one another. In some implementations, the hinge joint 126 includes a hinge pin 128 positioned within an opening 129. In this implementation, the opening 129 can be shared between the first attachment member 122 and the second attachment member 124 such that the hinge assemblies 120 joins the first attachment member 122 and the second attachment member 124 at the hinge joint 126. It should be understood that the implementation of the hinge joint 126 described here is merely an example of possible implementations. In further implementations, the hinge joint 126 can be any hinge joint capable of allowing movement or rotation of the first attachment member 122 respect to the second attachment member 124 about the hinge joint 126.

Figure 4A:
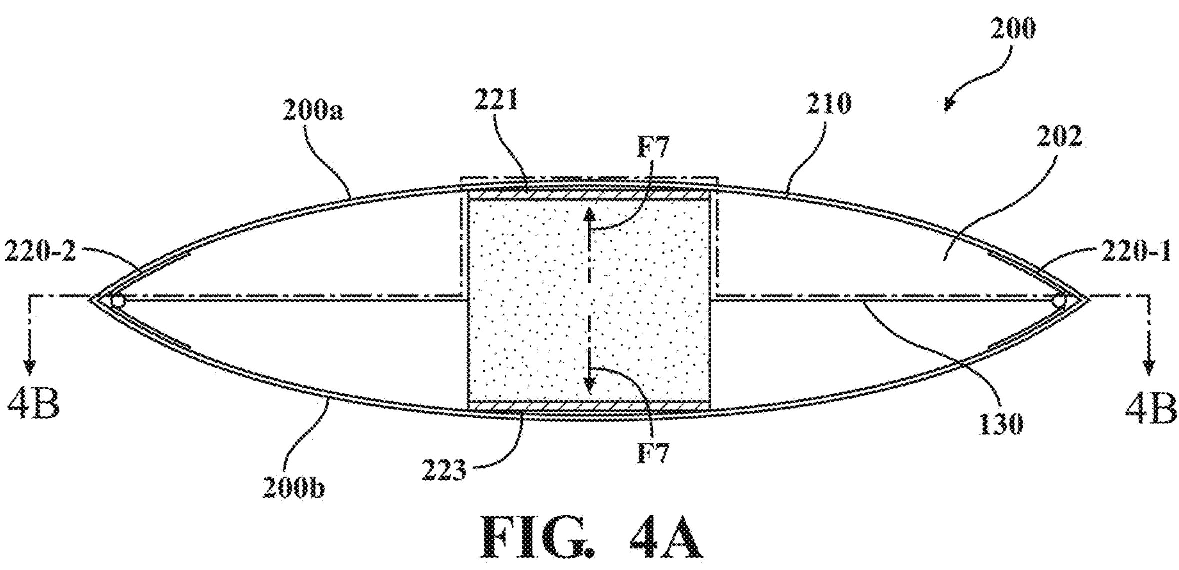
FIG. 4A is a schematic side view of an illustration of an actuator, according to another implementation described herein.
Figure 4B:
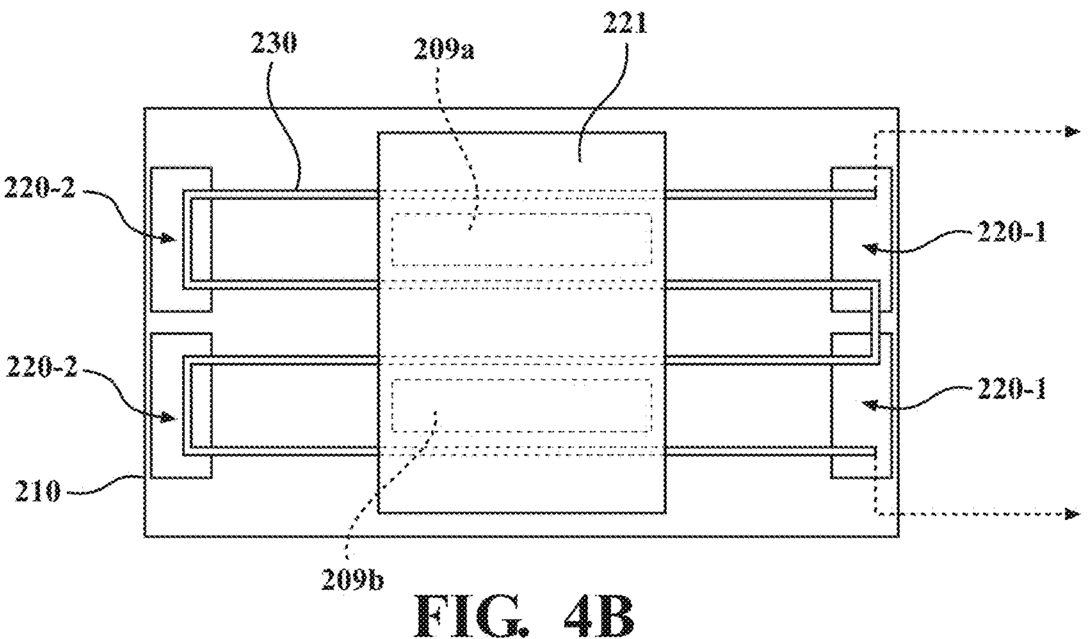
FIG. 4B is a schematic cross-sectional plan view of the actuator shown in FIG. 4A.

Hinge assemblies 120 along respective edges of the actuator 100 can have similar or different designs. For example, the first hinge assembly 120-1 and the second hinge assembly 120-2 can employ a similar or different design of hinge assembly. The first hinge assembly 120-1 and/or the second hinge assembly 120-2 can employ elements of or combinations of any components or elements of the hinge assemblies described herein. In one or more implementations, the first hinge assembly 120-1 can be substantially similar to the second hinge assembly 120-2, including number of elements and configuration of the hinge assembly. The first hinge assembly 120-1 and/or the second hinge assembly 120-2 can include more or fewer elements than depicted in FIG. 1C. In one or more arrangements, the first hinge assembly 120-1 along one edge of the actuator and the second hinge assembly 120-2 along the opposite edge of the actuator can each be a single continuous element extending along the respective edge of the actuator as shown in FIG. 1C. In one or more arrangements, both the first hinge assembly 120-1 and the second hinge assembly 120-2 can be made of a plurality of separate elements as shown in FIG. 4B. Alternatively, in one or more arrangements, one of the first hinge assembly 120-1 and the second hinge assembly 120-2 can be made of a plurality of elements, and the other one of the first hinge assembly 120-1 and the second hinge assembly 120-2 can be a single continuous element.

The hinge assemblies 120 can be operatively connected to the outer skin 110. However, though depicted as a separate element from the outer skin 110, the hinge assemblies 120 described herein can be integrated into the outer skin 110. In further implementations, the outer skin 110 can be configured such that it performs the functions of the hinge assemblies 120. In one such example, the outer skin 110 can be configured such that the interconnection between layers or the bend in a single layer translates forces applied by an input-responsive element 130 connected to the outer skin 110, thereby changing the magnitude of the first dimension 140 of the actuator 100 while inversely affecting the magnitude of the second dimension 150 of the actuator 100.

The actuator 100 can further include the input-responsive element 130. The input- responsive element 130 includes one or more elements capable of transitioning from a first configuration to a second configuration. The transition of the input-responsive element 130 from the first configuration to the second configuration displaces the hinge assemblies 120 with respect to the outer skin 110 and causes a change in configuration of the outer skin 110. In some implementations, the input-responsive element 130 can include a SMM wire 132. In some instances, it can also include a heating element 134. Though the heating element 134 is described as surrounding the SMM wire 132, the heating element 134 can have any form of operative connection to the SMM wire 132, such that heat can be delivered. The SMM wire 132 can be configured to increase or decrease in length (and/or other dimension) upon changing phase, for example, by being heated to a phase transition temperature.

The SMM wire 132 can include a SMA. In some arrangements, SMAs can be compositions which transition from a soft martensitic metallurgical state to a hard austenitic metallurgical state in response to heating above an austenitic transition temperature, $A_f$. The SMA can be processed while in a high-temperature austenitic phase to a desired configuration. The SMA can be cooled below a second transition temperature $M_f$ without change of physical dimensions to create a "memory" of the desired configuration (i.e., a memorized configuration), where $M_f$ is between the austenitic and martensitic states. Once the desired configuration is memorized, the SMA can be mechanically deformed into a first configuration while in the martensitic state. The SMA can remain in this first configuration or allow for other deformation until further heating to a temperature above $A_f$. Once above the $A_f$, the SMA can revert to the memorized configuration (which can also be referred to as the second configuration). During the transition from the first configuration to the second configuration, the SMA can exert large forces on adjacent members.

In some implementations, the SMM wire can comprise an SMA material with a high $A_f$ temperature, such as a $A_f$ temperature between about 90° C. and about 110° C. In further implementations, the input-responsive element 130 does not utilize the heating element 134, such as when employing a SMA which can be resistively heated using an electrical current. Example of the input-responsive element 130 can include Nickel-Titanium (Ni—Ti), which has resistivity allowing it to be heated directly with an electrical current.

Conversely, when increasing in temperature, the SMA can transition from a predominantly martensitic state to a predominantly austenitic state. The transition in states can result in the SMA changing from the first configuration to the second configuration, or vice versa. In some implementations, SMAs which can be used with one or more implementations described herein can include Ni—Ti, Ni—Ti-Niobium (Nb) alloys, Ni—Ti-Iron (Fe) alloys, Ni—Ti-copper (Cu) alloys, Ti-Palladium (Pd) alloys, Ti—Pd—Ni alloys, Ni—Ti—Cu alloys, Ti—Nb-Aluminum (Al) alloys, Hf—Ti—Ni alloys, Ti—Nb, Ni—Zr—Ti alloys, beta-phase titanium and combinations thereof. In some implementations, the first configuration can be maintained by the SMM wire 132 (e.g., a static first configuration). In implementations having a static first configuration, the SMM wire 132 can be referred to as having a two way shape-memory effect. Two way shape-memory effect (TMSME) refers to a SMA which has a specific memorized shape in both the martensitic state and in the austenitic state. In further implementations, the first configuration relates to the resting state of the actuator 100 as interacting with the SMM wire 132. In these implementations, the first configuration can be considered dynamic, as the first configuration is not programmed to the SMM wire 132. In further implementations, the SMM can be a SMP.

The input-responsive element 130 can be heated in any suitable manner, now known or later developed. For instance, SMA wires can be heated by the Joule effect by passing electrical current through the wires. In some implementations, the input-responsive element 130 can include the heating element 134. The heating element 134 can include one or more components configured to increase the temperature of the SMM wire 132, such as a resistive heating element. The heating element 134 can be in operative connection with the SMM wire 132. In some implementations, the heating element 134 can operatively connected with the SMM wire 132, such as can be positioned around the SMM wire 132. In further implementations, the heating element 134 can be aligned parallel with the SMM wire 132. Though depicted as covering and/or increasing the temperature of the entirety of the SMM wire 132, the heating element 134 can be positioned or configured to affect any portion of the SMM wire 132. The heating element 134 can further be in operative connection with a computing device (not shown). The heating element 134 can receive an input, such as an electrical input from the computing device. In response to the input, the heating element 134 can provide heat for the SMM wire 132 resulting in a transition from a first configuration to a second configuration as described above. In some instances, arrangements can provide for cooling of the SMA wires, if desired, to facilitate the return of the wires to the first configuration.

The input-responsive element 130 can be connected to the hinge assemblies 120 at the connection element 136. The connection element 136 can be an element of the hinge assemblies 120 and/or a location on the hinge assemblies 120 where the input-responsive element 130 has a contact with the hinge assemblies 120 such that the input-responsive element 130 can apply force to the hinge assemblies 120. The connection element 136 incorporates a broad range of connection types in connection devices. In some implementations, the connection element 136 is an element configured to receive the input-responsive element 130, such as a loop or a hole. For instance, an SMA wire can pass through an aperture defined in the hinge assembly 120 (such as in an aperture formed in one of the first attachment member 122 and the second attachment member 124, and/or in a space defined between the hinge joint 126 and a respective one of the first and second attachment members 122, 124) and wrap around the hinge joint 126 and return through another aperture defined in the hinge assembly 120 (such as in an aperture formed in one of the first attachment member 122 and the second attachment member 124, and/or in a space defined between the hinge joint 126 and a respective one of the first and second attachment members 122, 124). In further implementations, the connection element 136 is a location of permanent or semi-permanent attachment, such as the spot weld or a wraparound of the input-responsive element 130 at the hinge assemblies 120. In one or more implementations, the connection element 136 is configured to withstand the temperatures produced by the input-responsive element 130. One skilled in the art will understand the breadth of possible connection types which can be used for the connection element 136.

FIG. 1C shows a single input responsive element 130 extending in an alternating pattern between opposed hinge assemblies 120. An "alternating pattern" refers to a situation where an end of the element 130 is connected to a first one of hinge assemblies 120 (labeled 120-1 in FIG. 1C for purposes of description) and then extended through cavity 102 to a second one of hinge assemblies 120 (labeled 120-2) along an opposite edge of the actuator. This extended portion of the element 130 may then be connected to the second hinge assembly and then extended back through the cavity 102 in the opposite direction toward the first hinge assembly, where the portion of the element 130 reaching back to the first hinge assembly may again be connected to the first hinge assembly (or to another hinge assembly (not shown) along the same edge of the actuator as the first hinge assembly. This alternating pattern (extending in one direction across the cavity, then in the opposite direction) may be repeated as often as desired for a single, continuous input responsive element 130 to connect the element 130 with any desired number of opposed hinge assemblies 120. FIG. 1C shows possible locations 130*p* of connections to power source(s) (not shown) configured for providing inputs to the input responsive element 130.

In one or more arrangements, an actuator as described herein may include a single continuous input responsive element 130 as shown in FIGS. 1A-1C. Alternatively, an actuator as described herein may include multiple input responsive elements 130, with each element mounted in the actuator so as to extend (either exclusively or primarily) in dimension 140. Each of the separate input responsive elements 130 may be configured to receive an associated input for energizing an associated SMM wire 133 as described herein. Thus, when inputs are provided to all of the separate elements 130, the separate elements operate together to change the shape of the actuator as described herein.

In still other arrangements, the input responsive elements 130 may include both some elements that extend between opposed hinge assemblies 120 multiple times (as shown in FIGS. 1A-1C), and some elements that extend between the opposed hinge assemblies 120 only once.

In the arrangement shown in FIG. 1C, a space having a width dl may be provided between alternating spans of the element 130 to enable one or more spring member(s) 109 to be positioned at a desired location(s) in the cavity. In this arrangement, the dimension d1 may be minimized in accordance with the spring member dimensions in order to minimize the length of the portion 130*a* of the element 130 connected to (and extending along) the second hinge assembly 120-2. This may aid in maximizing the portions of the length of element 130 which extend parallel or substantially parallel to dimension 140 and which shorten or contract in dimension 140 when an input is provided to the element 130. It is these portions of the element 130 which most directly affect expansion of the actuator in dimension 150. In some instances, the connections of the input-responsive element 130 can include connecting to the outer skin 110.

In one or more arrangements including spring members as described herein, the element 130 may include a covering (not shown) configured to isolate the element 130 and prevent contact with adjacent spring members positioned in the cavity 102. This may be beneficial in cases where a spring member adjacent an element 130 is formed from a resilient foam material or a metallic material. In one or more arrangements, the covering may be a silicone or rubber-based material. The covering material may be structured to be stretchable to accommodate (and responsive to) changes in SMM wire dimensions when an input is applied to the associated input-responsive element. The stretchability of the covering may minimize reaction forces on the wire and restriction of the wire dimensions responsive to application of the input. In one or more arrangements, the covering material may be thermally and/or electrically-insulative. In one or more arrangements, the covering material may be formulated to accommodate operation of embodiments of the input-responsive element and actuator as described herein for thousands of actuation cycles, without fracturing or otherwise failing.

It is understood that any of a variety of alternative arrangements for connecting the element 130 to the hinge assemblies 120 and for positioning the spring member(s) 109 in the cavity 102 may be utilized. Thus, it is understood that the input-responsive element(s) 130 as depicted here in the actuator 100 is a non-limiting examples of a variety of possible formations and connections.

It will also be appreciated that the input-responsive element may not be directly attached to the hinge assemblies. For instance, the input-responsive element 130 can pass through an aperture defined in the first hinge assembly 120-1 and/or the second hinge assembly 120-2 and wrap around an associated hinge joint and return through another aperture defined in the first hinge assembly 120-1 and/or the second hinge assembly 120-2.

Through the use of an alternating pattern of input responsive elements, the actuator 200 can create a substantially uniform actuation across the outer surface area of the actuator 200. In addition, the use of an alternating pattern can be used to achieve a desired actuation force and/or actuation time for the actuator 200. Further, the alternating pattern allows the weight of the occupant to be equally distributed across the actuator, preventing localized stresses.

Referring again to FIGS. 1A-1C, to aid in preventing formation of a localized depression in the outer skin 110 due to localized loading, at least one spring member 109 may be positioned within the cavity 102 and structured to exert forces on the first actuator side 100*a* and the second actuator side 100*b* tending to urge the first actuator side and second actuator side away from each other along the second dimension 150.

Figure 2:
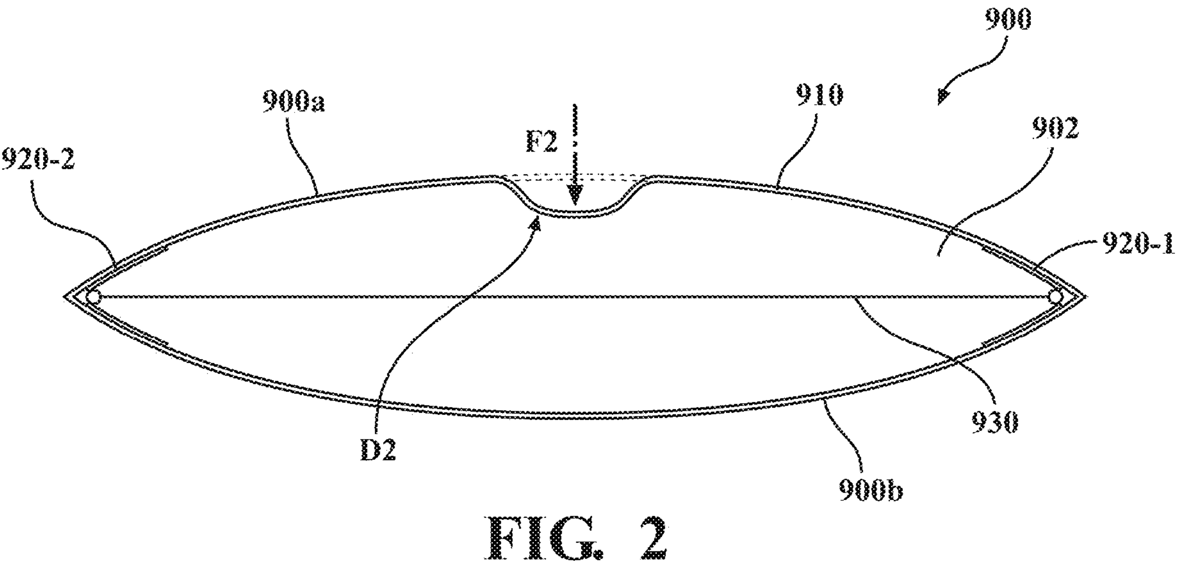
FIG. 2 is a schematic side view of an embodiment of an actuator similar to the embodiment shown in FIGS. 1A-1C and described herein, except that actuator of FIG. 2 does not include one or more spring members positioned in the actuator cavity.

FIG. 2 is a schematic side view of an embodiment of an actuator 900 similar to the embodiment shown in FIGS. 1A-1C and described herein, except that actuator 900 does not include one or more spring members 109 positioned in the actuator cavity 902. In the actuator 900, there is no internal support for first actuator side 900*a* or second actuator side 900*b*. Thus, the only features controlling movement and/or deflection of the actuator sides 900*a*, 900*b* are the hinge assemblies 920.

Referring to FIG. 2, a problem may arise in applications of the actuator 900 where a localized load F2 is applied to the actuator when the SMM wire of an input responsive element 930 is unenergized by an associated input. In such cases, the applied load F2 may produce a localized depression D2 in the outer skin 910 of the actuator. Then, when the SMM wire is energized, contraction of the wire may cause the affected actuator side (in this case, first actuator side 900*a*) to deflect inwardly and "fold around" the source of the applied load F2. This prevents the affected actuator side from moving as intended when the SMA wire is energized, thereby nullifying the intended effect of energizing the SMA wire. If the actuator outer skin 910 is made from a stiffer material to try to prevent formation of the depression D2, at least a portion of the actuation force produced by energizing the SMA wire may be dissipated in bending the stiffer outer skin material in order to produce the desired movement of the affected actuator side. The spring member(s) 109 shown in FIGS. 1A-1C may (either directly or indirectly) physically support the first actuator side 100*a* and the second actuator side 100*b* against localized deformations due to applied loads.

The arrangement of FIGS. 1A-1C shows a single spring member 109 positioned between adjacent spans of the input responsive element 130 extending between opposed edges of the actuator 100. However, any number of spring members may be positioned in the cavity 102 according to the actuator side support requirements of a given application, depending on the amount of outer skin surface area to be supported, the type(s) of spring member(s) used, and other pertinent factors.

In addition, any of the spring member(s) described herein may have any suitable form(s) or structure(s) suitable for the purposes described herein. In the embodiments shown in FIGS. 1A-1C, the spring member 109 is shown in the form of a mass of resiliently deformable foam material. Examples of suitable resiliently-deformable foam materials include expanded polystyrene (EPS), polyurethane, polyamide, polyethylene, nylon, and silicone foam materials. Metallic foams formed from and/or incorporating materials such as aluminum or stainless steel may also be suitable for the purposes described herein. In other arrangements, one or more of the spring member(s) described herein may be in the form of conventional coil springs. In yet other arrangements, one or more of the spring member(s) described herein may be in the form of a suitable conical disc spring arrangement structured to provide the desired support to the first and second actuator sides 100*a* and 100*b*. Examples of conical disc spring arrangements suitable for the purposes described herein may be found in U.S. Pat. Nos. 10,677,310, 10,371,229, and 11,137,045, the disclosures of which are incorporated herein by reference in their entireties. Other types of spring member(s) are also contemplated.

Figure 3A:
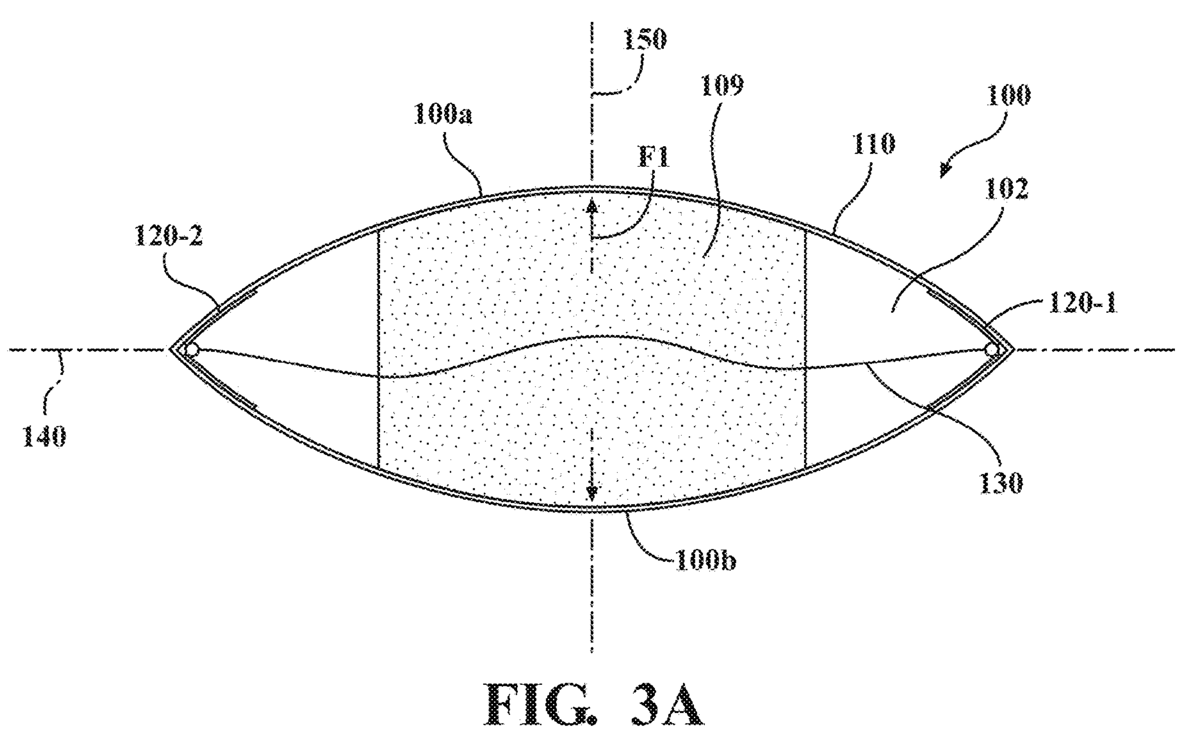
FIG. 3A is the view of FIG. 1A showing the actuator prior to application of an input to an input-responsive element of the actuator.
Figure 3B:
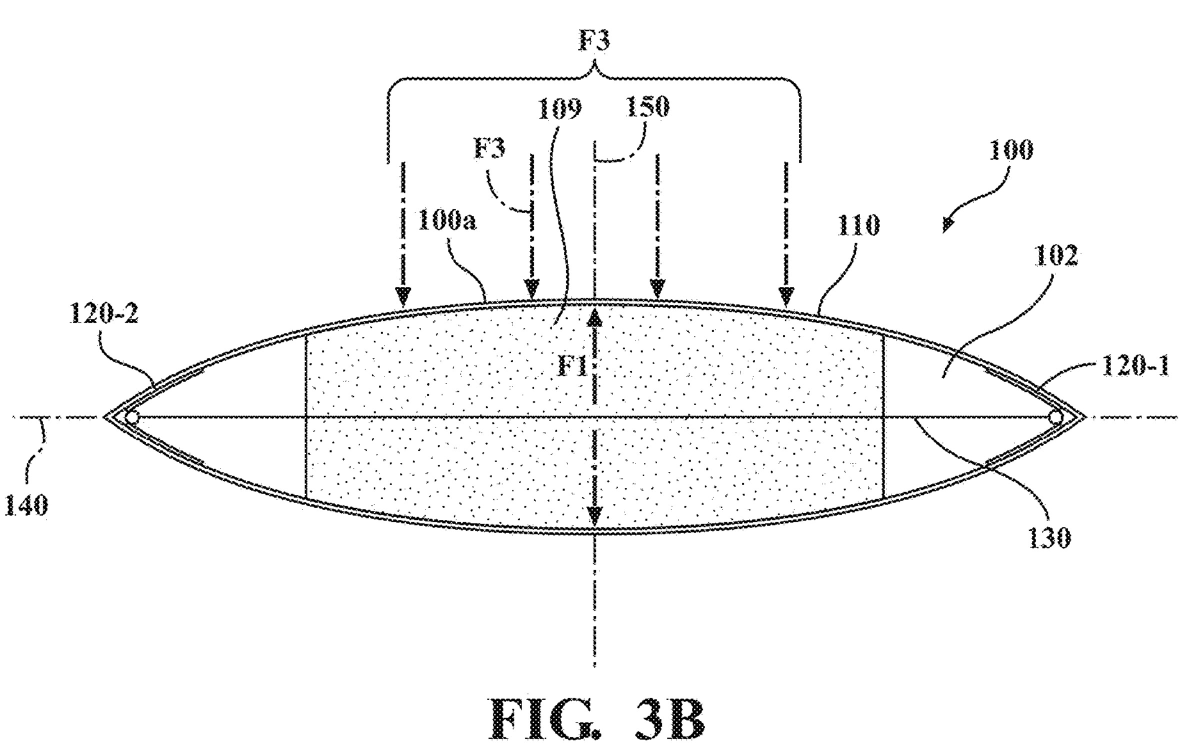
FIG. 3B is the view of FIG. 3A showing application of a load to an exterior of the actuator, for example, due to a seat occupant sitting in a seat into which the actuator is incorporated, and prior to application of an input to an input-responsive element of the actuator.
Figure 3C:
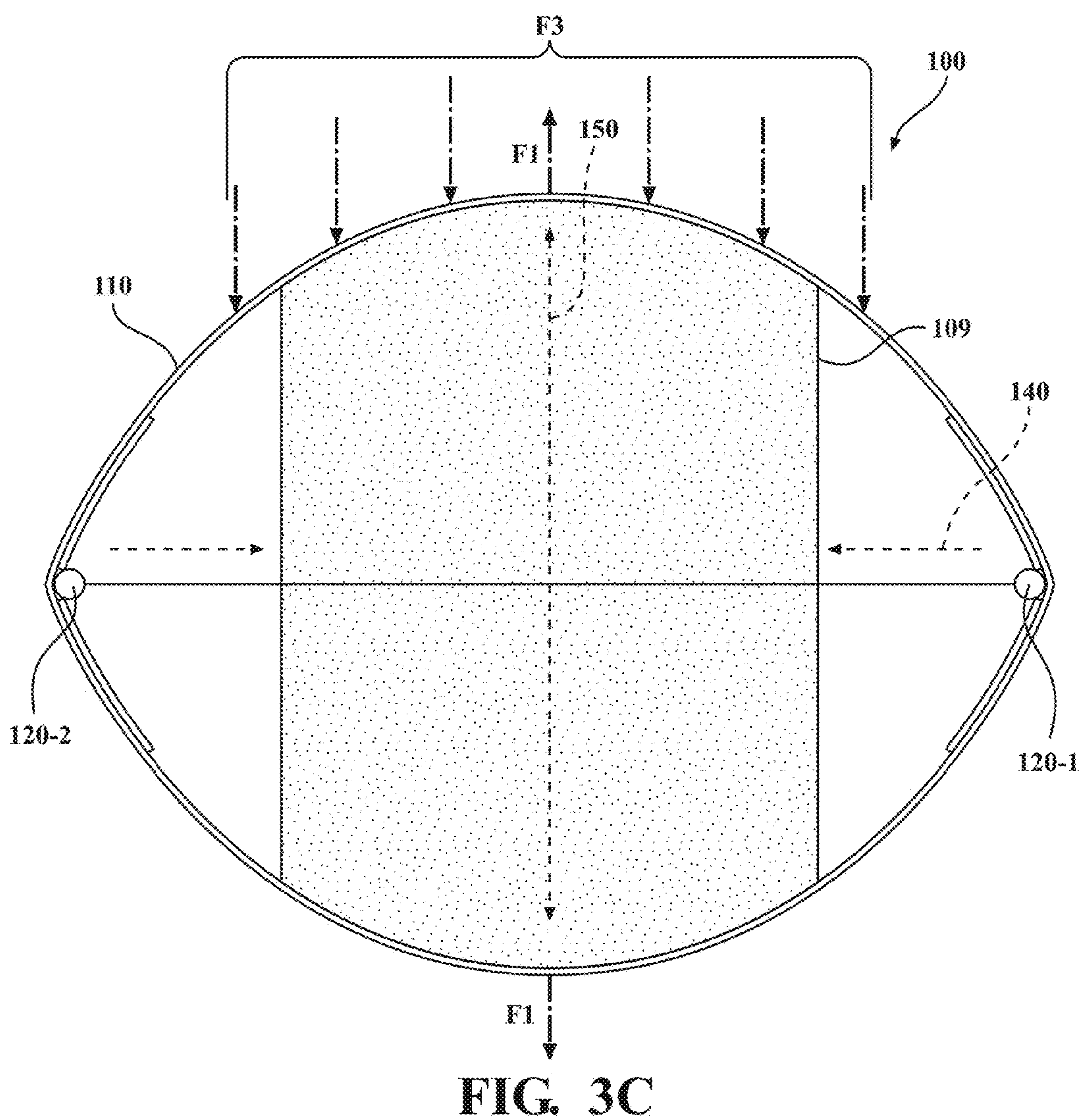
FIG. 3C is the view of FIG. 3B showing operation of the actuator to exert forces against the externally-applied load of FIG. 3B, responsive to application of an input to an input-responsive element of the actuator.

FIGS. 3A-3C are side views of the actuator 100 showing the actuator prior to application of an input to the input-responsive element 130 and also during operation of the actuator, when an input is provided to the input-responsive element 130. The actuator 100 is depicted in FIG. 3A with the outer skin 110, the hinge assemblies 120, and the input-responsive element 130 in a passive configuration. "Passive configuration," as used herein, relates to a state or position of the actuator when at rest, "unenergized" or otherwise not receiving an input (i.e., when no input is provided to the input-responsive element 130 and when the actuator is not externally loaded (for example, by the weight of a vehicle seat occupant)).

In arrangements described herein, the spring member(s) 109 may be structured so as to always exert spring forces F1 on the first actuator side 100*a* and second actuator side 100*b* urging the first actuator side and second actuator side away from each other, thereby constantly supporting first and second actuator sides against localized applications of forces and preventing any resulting localized deformations. In such arrangements, the forces exerted by the spring member(s) 109 may tend to force the first actuator side 100*a* and second actuator side 100*a* away from each other, along dimension 150. As seen in FIG. 3A, this movement of the first and second actuator sides 100*a*, 100*b* may tend to draw the hinge assemblies 120 toward each other in the same manner described herein as resulting from the energization and resultant shortening of the SMM wire(s). This, in turn, may produce slack in the SMM wire(s) 132 when the actuator is not externally loaded.

FIG. 3B shows the actuator 100 during application of a load to an exterior of the actuator along one or more of first actuator side 100*a* and/or second actuator side 100*b*, and prior to application of an input to the input responsive element 130. FIG. 3B shows the application of a distributed load F3 (shown as multiple arrows in phantom) applied over a portion of the first actuator side 100*a* along dimension 150. Such a load may arise from the weight of a user sitting in a seat (not shown) in which the actuator 100 is incorporated.

As seen in FIG. 3B, the load F3 may have the effect of "flattening" the actuator 100 (in comparison with the actuator 100 as shown in FIG. 3A), also compressing the spring member(s) 109. This acts to force the hinge members 120 away from each other along dimension 140. This, in turn, removes the slack from the input responsive element that was previously produced by the forces exerted by the spring member(s) along dimension 150.

FIG. 3C is an illustration of the actuator 100 in an activated configuration, according to some implementations. "Activated configuration," as used herein, relates to a state or position of the actuator when the input-responsive element 130, specifically the SMM wire 132, has been energized or otherwise receives an input to cause it to transform. For instance, in the case of the SMM wire 132, the SMM wire can transition from the martensitic state (which allows for the passive configuration) to the austenitic state. The actuator 100 is depicted with the first dimension 140 and the second dimension 150. The first dimension 140 can include a direction along a plane that extends through the one or more hinge assemblies 120. In one or more implementations, the first dimension 140 can be substantially parallel and/or create a bisecting line through the hinge assemblies 120, through the interfacing region 118, or combinations thereof. The second dimension 150 is a direction along the plane, the plane and/or the direction being substantially perpendicular to the first dimension 140.

FIG. 3C shows operation of the actuator against the applied load F3 after application of an input to the input responsive element 130. In operation, the SMM wire 132 increases in temperature in response to an input. In some implementations, the SMM wire 132 receives an electrical input, such as from a computing device and/or a power source. The computing device can be part of a system, such as an actuator control system. The SMM wire can heat up in response to the resistance of the wire to electrical input. In further implementations, the SMM wire is heated by a heating element 134. The heating element 134 can receive an input, causing the heating element 134 to produce heat and increasing the temperature of the SMM wire 132. The SMM wire 132, upon reaching a transition temperature $A_f$, changes from the first configuration to a second configuration. In this implementation, the SMM wire 132 in the second configuration can contract, thereby applying a force on each of the hinge assemblies 120. As a result, the hinge assemblies 120 are drawn toward each other in the direction of the first dimension 140.

As the hinge assemblies 120 move toward one another, the first attachment member 122 and the second attachment member 124 can pivot along the hinge joint 126. By pivoting, the first attachment member 122 and the second attachment member 124 can translate the force from the SMM wire 132 to the upper interior surface 114 and the lower interior surface 116, respectively. As such, changes in the size or shape of the outer skin 110 in the second dimension 150 can create an inverse change in size or shape of the outer skin 110 in the first dimension 140. The translated force through the hinge assemblies 120 creates a deformation in the outer skin 110. The deformation of the outer skin 110 causes the actuator 100 to expand along the second dimension 150. The expansion of the actuator 100 along the second dimension 150 results in the actuator 100 having a decreased magnitude along the first dimension 140 and an increased magnitude along the second dimension 150.

Also, during contraction of the SMM wire 132, the compressed spring member(s) 109 exert forces F1 in dimension 150 on first and second actuator sides 100*a*, 100*b* after energization of the SMM wire(s) and during movement of the first and second actuator sides 100*a*, 100*b* along second dimension 150. In particular arrangements, by appropriate selection of spring member and outer skin parameters, the spring member(s) 209 may be configured to aid in moving the first and second actuator sides 100*a*, 100*b* to a degree that enables the use of SMM wire(s) having relatively lower diameters and/or thermal expansion coefficients. The details of suitable spring member characteristics, outer wall material(s) and structures, SMM wire characteristics and other pertinent parameters for a particular actuator application and desired actuator configuration may be determined analytically and/or iteratively through experimentation. Thus, in the manner just described, the forces F1 exerted by the compressed spring member(s) may be configured to act synergistically with the shortening SMM wire(s) in moving the first and second actuator sides 100*a*, 100*b* along dimension 150 when an input is provided to the one or more SMM members. As the spring members 109 extend or lengthen during movement of the sides 100*a*, 100*b*, the magnitude of the forces F1 exerted by the spring members on the sides 100*a*, 100*b* may diminish.

The spring member(s) may be in direct physical contact with the first and second actuator sides 110*a*, 110*b*, to directly exert forces on the actuator sides. Alternatively, the spring member(s) may exert forces on the actuator sides indirectly, through one or more intermediate member(s). In one example, FIGS. 4A and 4B show an actuator embodiment 200 including at least two spaced apart spring members 209*a*, 209*b* positioned within the cavity 202, with each of the spring members being structured to exert forces F7 on the first actuator side 210*a* and second actuator side 210*b*. The spring member forces F7 tend to urge the first actuator side 200*a* and second actuator side 200*b* away from each other along the second dimension 150. In addition, the actuator 200 may include first hinge assemblies 220-1, second hinge assemblies 220-2, and a load distribution member 221 positioned between the spring members 209*a*, 209*b* and one of the first actuator side 200*a* and second actuator side 200*b*. As shown in FIG. 3B, the load distribution member 221 also extends from a first spring member 209*a* of the at least two spring members to a second spring member 209*b* of the at least two spring members.

In addition, the actuator 200 may include another load distribution member 223 positioned between the two spring members 209*a*, 209*b* and the other, second actuator side 200*b*. The other load distribution member 223 may also extend from the first spring member 209*a* to the second spring member 209*b*.

In some arrangements, as shown in FIGS. 4A-4B, the load distribution members 221, 223 may extend past or overlap the spring members 209*a*, 209*b*. The load distribution members 221, 223 may aid in supporting the first and second actuator sides 200*a*, 200*b* by helping to distribute any external loads applied to the actuator sides among all the spring members 209 in contact with the load distribution members. This may enable the supporting spring members to be spaced relatively farther apart if needed, while still providing sufficient support to the actuator sides against localized loading and deformations. In particular arrangements, the load distribution members 221, 223 may be supported by any desired number of spaced apart spring members 209 to enable the size of the actuator 200 to be increased as needed while still providing sufficient support to the actuator sides.

The load distribution members 221, 223 may be formed from any suitable material or materials. In particular arrangements, each of the load distribution members 221, 223 may be structured to have a stiffness sufficient to prevent the localized outer skin deformation described herein, and also a flexibility or bendability sufficient to enable a degree of conformity to the first and second actuator surfaces as the surfaces as the surfaces change shape during operation of the actuator.

The embodiment shown in FIGS. 4A and 4B may operate in the same manner as previously described with regard to FIGS. 1A-1C and FIGS. 3*a*-3*c*.

Figure 5A:
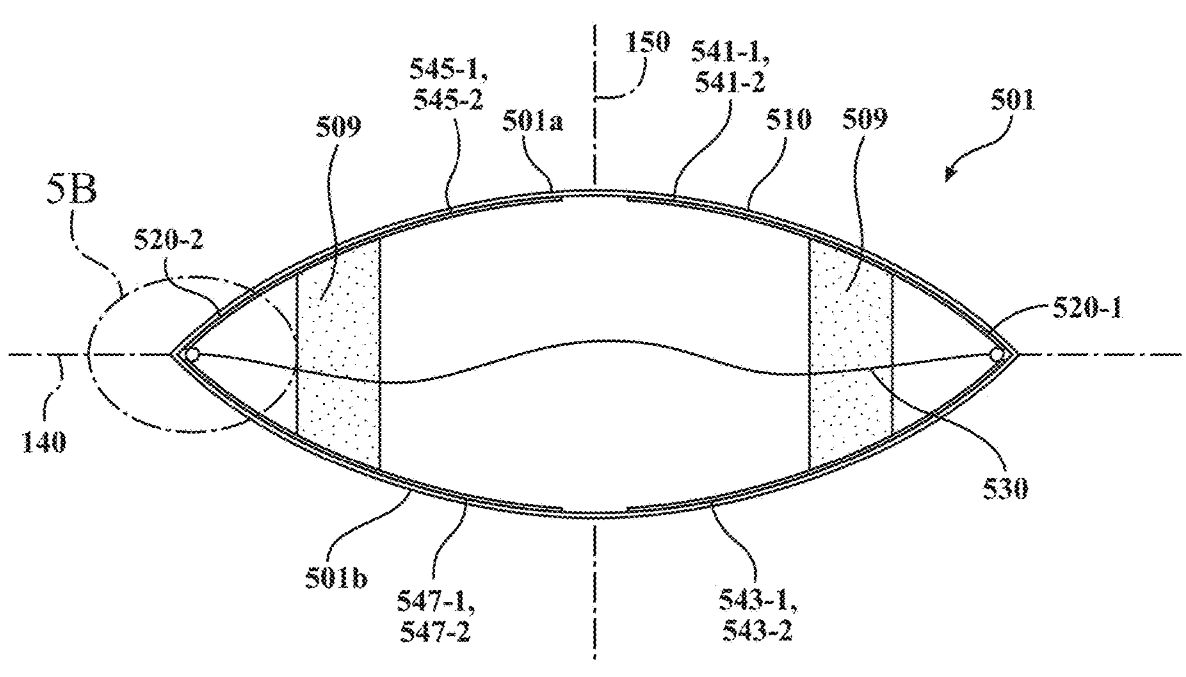
FIG. 5A is a schematic side view of an illustration of an actuator, according to another implementation described herein.
Figure 5B:
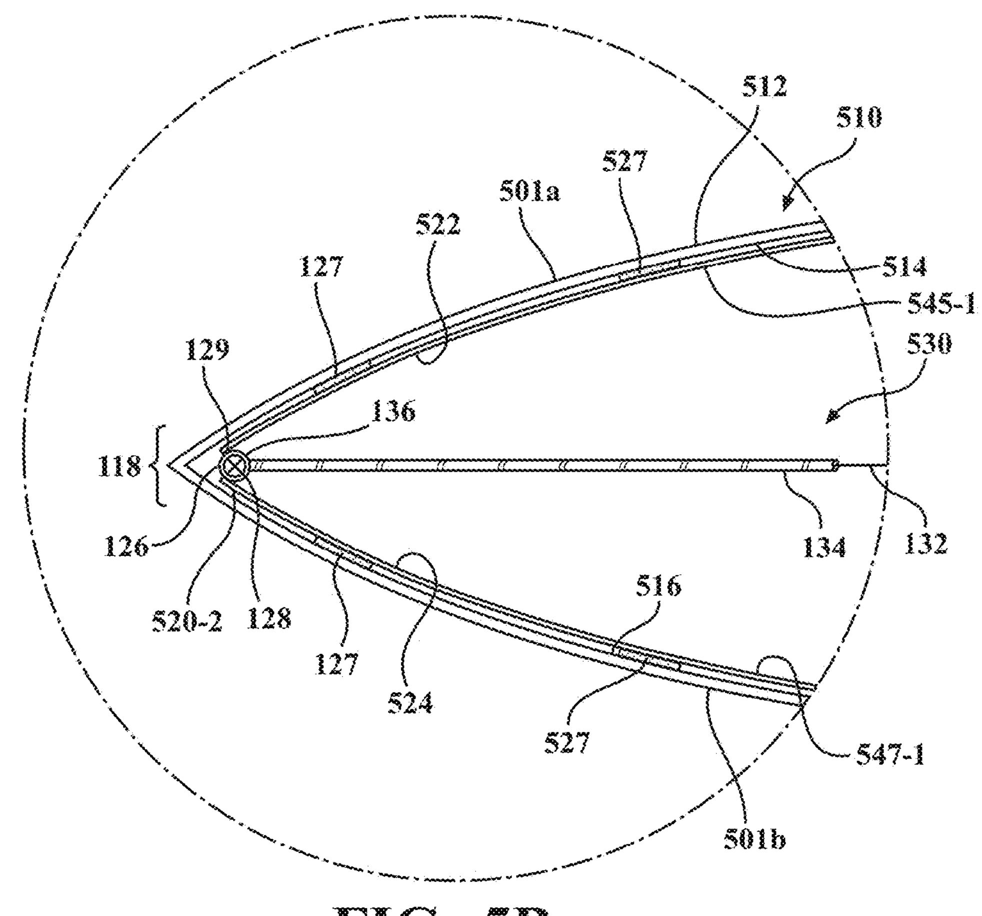
FIG. 5B is a magnified schematic view of a portion of the actuator in shown in FIG. 5A.
Figure 5C:
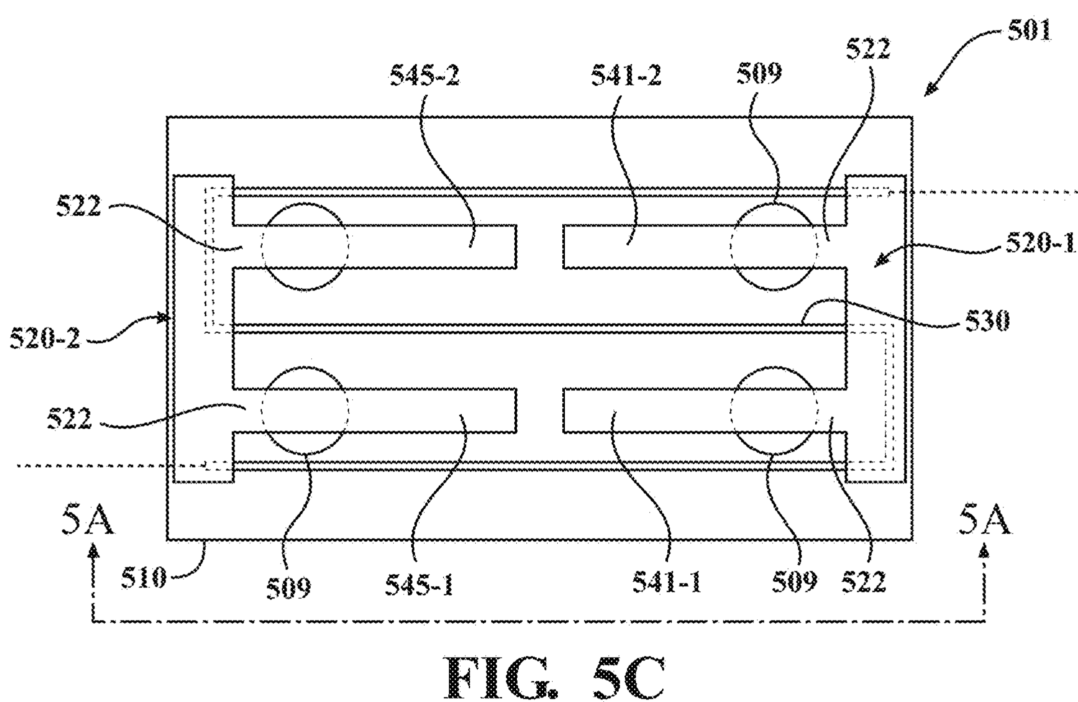
FIG. 5C is a schematic cross-sectional plan view of the actuator shown in FIGS. 5A and 5B.

FIGS. 5A-5C are schematic views showing an arrangement of an actuator 501 in accordance with another embodiment described herein. FIG. 5A is a schematic side view of the actuator 501. FIG. 5B is a magnified view of a portion of the actuator in shown in FIG. 5A. FIG. 5C is a schematic cross-sectional plan view of the actuator 501, shown with first side 501*a* removed. The actuator shown in FIGS. 5A-5C may include an outer skin 510, at least a pair of opposed hinge assemblies 520-1 and 520-2, at least on input responsive element 530, and at least one spring member 509 as previously described. Each of the hinge assemblies 520-1, 520-2 may include first and second attachment members 522, 524 as previously described.

In addition, the actuator 501 may include at least one first arm 541 extending from a first attachment member 522 of first hinge assembly 520-1 and at least one second arm 543 extending from a second attachment member 524 of the first hinge assembly 520-1 so as to reside directly opposite an associated first arm 541 extending from the first attachment member 522 of the first hinge assembly 520-1. The hinge assembly 520-1 shown in FIGS. 5A-5C includes two first arms 541-1 and 541-2 extending from the first attachment member 522 and two second arms 543-1 and 543-2 extending from the second attachment member 524 of hinge assembly 520-1. However, a hinge assembly may alternatively include a single arm or more than two arms extending from each of the associated attachment members.

At least one spring member 509 may be positioned between each first hinge assembly first arm 541 and an associated first hinge assembly second arm 543 so as to exert forces on the first hinge assembly first arm and the first hinge assembly second arm urging the first hinge assembly first arm and the first hinge assembly second arm away from each other along dimension 150 as previously described. In FIGS. 5A-5C, a spring member 509 is positioned between arms 541-1 and 543-1 of hinge assembly 520-1, and another spring member 509 is positioned between arms 541-2 and 543-2 of the hinge assembly 520-2. Each spring member may 509 be attached to one or more of the associated first and second arms 541, 543 between which the spring member is positioned.

Figure 6A:
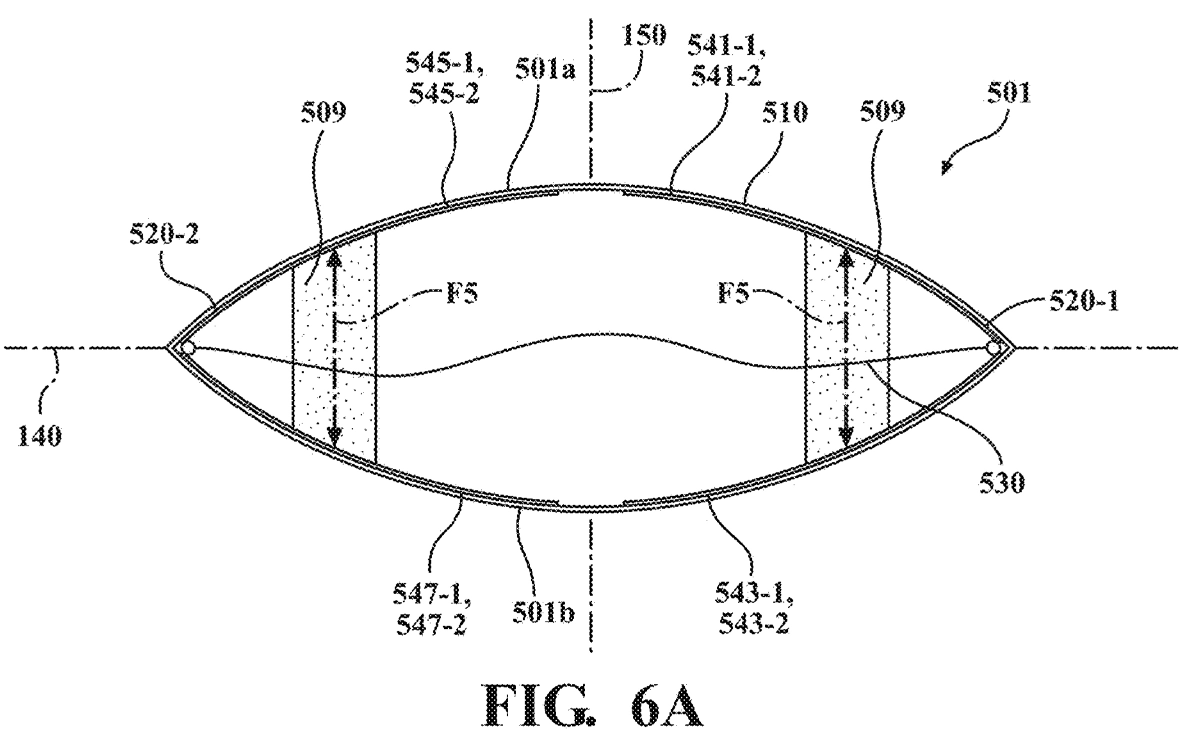
FIG. 6A is the view of FIG. 5A showing the actuator prior to application of an input to an input-responsive element of the actuator.

Also as seen in the FIGS. 5A and 6A, each of the first arms 541 may be structured to transfer a force F5 exerted by an associated spring 509 to the first actuator side 501*a* and each of the second arms 543 may be structured to transfer a force F5 exerted by an associated spring 509 to the second actuator side 501*b*, such that the forces F5 operate to urge the first actuator side 501*a* and the second actuator side 501*b* away from each other. Any of the arms described herein may be additionally connected a respective one of the actuator first side 501*a* and the actuator second side 501*b* via an associated connection element 527.

In addition, the actuator 501 may include at least one first arm 545 extending from a first attachment member 522 of a second hinge assembly 520-2 and at least one second arm 547 extending from a second attachment member 524 of the second hinge assembly so as to reside directly opposite an associated first arm 545 extending from the second hinge assembly first attachment member. The hinge assembly 520-2 shown in FIGS. 5A-5C includes two first arms 545-1, 545-2 extending from the first attachment member 522 of the second hinge assembly 520-2 and two second arms 547-1, 547-2 extending from the second attachment member 524 of the second hinge assembly 520-2. However, a hinge assembly may alternatively include a single arm or more than two arms extending from each of the attachment members.

Also, at least one spring member 509 may be positioned between each second hinge assembly first arm 545 and an associated second hinge assembly second arm 547 so as to exert forces on the second hinge assembly first arm and the second hinge assembly second arm urging the second hinge assembly first arm and the second hinge assembly second arm away from each other along dimension 150 as previously described.

In FIGS. 5A-5C, a spring member 509 is positioned between arms 545-1 and 547-1 of hinge assembly 520-2, and another spring member 509 is positioned between arms 545-2 and 547-2 of the hinge assembly 520-1. Each spring member may 509 be attached to one or more of the associated first and second arms 545, 547 between which the spring member is positioned. Also as seen in the FIGS. 5A and 6A, each of the first arms 545 may be structured to transfer a force F5 exerted by an associated spring 509 to the first actuator side 501*a* and each of the second arms 547 may be structured to transfer a force F5 exerted by an associated spring 509 to the second actuator side 501*b*, such that the forces F5 operate to urge the first actuator side 501*a* and the second actuator side 501*b* away from each other.

As seen from FIGS. 5A-5C, the first hinge assembly first arm(s) 541 and the second hinge assembly first arms 545 combine to support the first actuator side 501*a*. In addition, the first hinge assembly second arm(s) 543 and the second hinge assembly second arms 547 combine to support the second actuator side 501*b*.

All of the arms described herein may be designed for maximum stiffness to promote efficient transfer of forces from the spring members to the actuator sides. The arms may be formed from any suitable material or materials, including polymers, metals, etc. In addition, the spacing between opposed ones of arms 541 and 545 and between opposed ones of arms 543 and 547 may enable the arms to rotate freely during operation of the actuator 501.

Figure 6B:
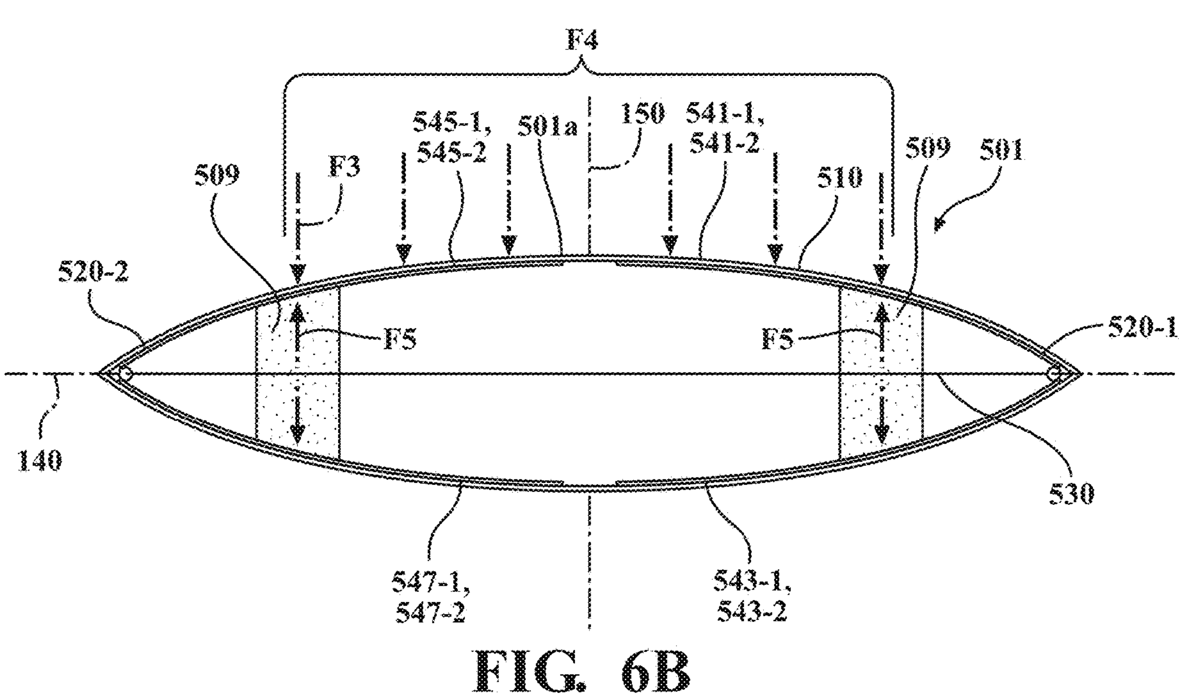
FIG. 6B is the view of FIG. 6A showing application of a load to an exterior of the actuator, for example, due to a seat occupant sitting in a seat into which the actuator is incorporated, and prior to application of an input to an input-responsive element of the actuator.
Figure 6C:
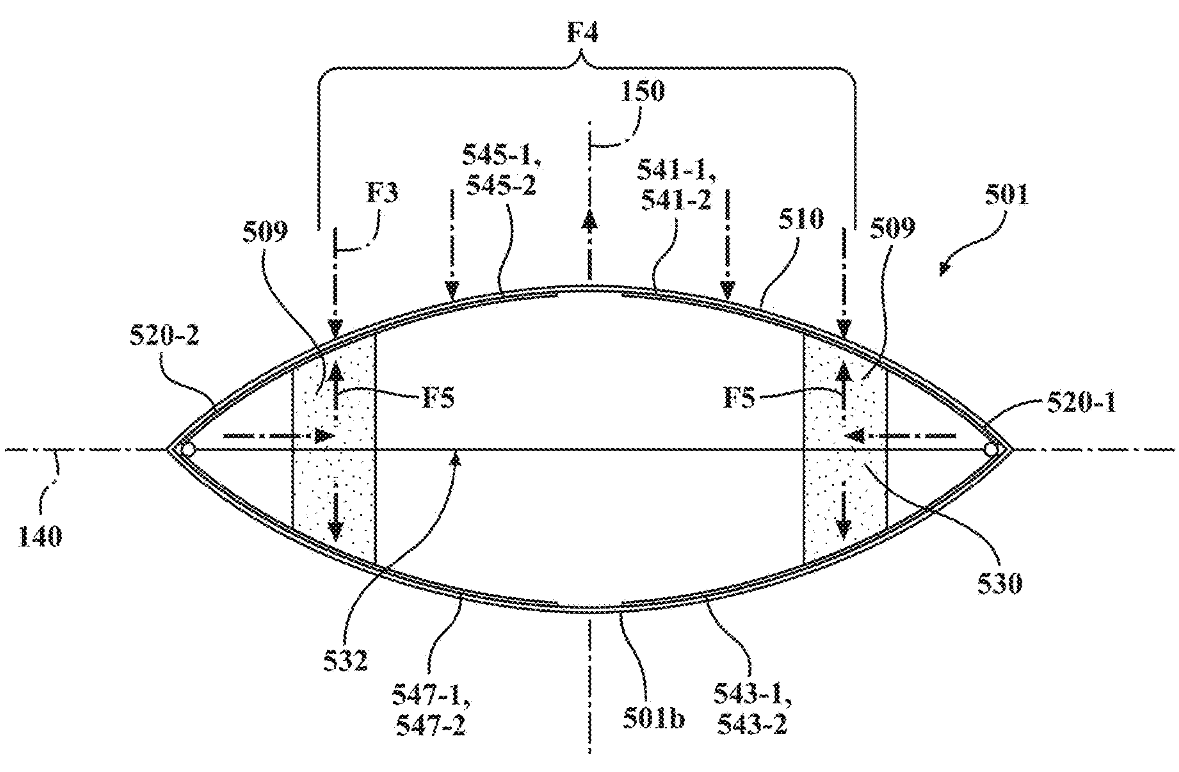
FIG. 6C is the view of FIG. 6B showing operation of the actuator to exert forces against the externally-applied load of FIG. 6B, responsive to application of an input to an input-responsive element of the actuator.

FIGS. 6A-6C shows the actuator 501 prior to application of an input to the input-responsive element 530, and also during operation of the actuator 501, when an input is provided to the input-responsive element 530. The actuator 501 is depicted in FIG. 6A with the outer skin 510, the hinge assemblies 520, and the input-responsive element 530 in a passive configuration as previously described. The spring member(s) 509 may be structured so as to always exert forces F5 urging the arms between which they are positioned into contact with associated ones of the first actuator side 501*a* and the second actuator side 501*b*, to force the first actuator side and second actuator side away from each other, thereby constantly supporting first and second actuator sides against localized applications of forces and preventing any resulting localized deformations.

In such arrangements, the forces exerted on the actuator sides 501*a*, 501*b* by the arms may tend to force the first actuator side 501*a* and second actuator side 501*b* away from each other along dimension 150. As seen in FIG. 6A, this movement of the first and second actuator sides 501*a*, 501*b* may tend to draw the hinge assemblies 520 toward each other in the same manner described elsewhere herein as resulting from the energization and resultant shortening of the SMM wire(s). This, in turn, may produce slack in the SMM wire(s) 132 when the actuator is not externally loaded.

FIG. 6B shows the actuator 501 during application of a load F4 distributed along an exterior of one or more of first actuator side 501*a* and/or second actuator side 501*b*, and prior to application of an input to the input responsive element 530. FIG. 6B shows the application of a distributed load F4 to the first actuator side 501*a* along dimension 150. Such a load may arise from the weight of a user sitting in a seat (not shown) in which the actuator 501 is incorporated.

As seen in FIG. 6B, the load F4 may have the effect of "flattening" the actuator 501, also compressing the spring member(s) 509. This acts to force the hinge members 520 away from each other along dimension 140. This, in turn, removes the slack from the input responsive element 530 that was previously produced by the forces exerted by the spring member(s) along dimension 150.

FIG. 6C is an illustration of the actuator 501 in an activated configuration, as previously described. For instance, in the case of the SMM wire 532, the SMM wire can transition from the martensitic state (which allows for the passive configuration) to the austenitic state. The actuator 501 is depicted with the first dimension 140 and the second dimension 150. The first dimension 140 can include a direction along a plane that extends through the one or more hinge assemblies 520 as previously described. In one or more implementations, the first dimension 140 can be substantially parallel and/or create a bisecting line through the hinge assemblies 120, through the interfacing region 118, or combinations thereof. The second dimension 150 is a direction along the plane, the plane and/or the direction being substantially perpendicular to the first dimension 140.

FIG. 6C shows operation of the actuator against the applied load F4 after application of an input to the input responsive element 530. In operation, the SMM wire 532 increases in temperature in response to an input. In some implementations, the SMM wire 532 receives an electrical input, such as from a computing device and/or a power source. The computing device can be part of a system, such as an actuator control system. The SMM wire can heat up in response to the resistance of the wire to electrical input. In further implementations, the SMM wire is heated by a heating element (not shown). The heating element 534 can receive an input, causing the heating element to produce heat and increasing the temperature of the SMM wire 532. The SMM wire 532, upon reaching a transition temperature $A_f$, changes from the first configuration to a second configuration. In this implementation, the SMM wire 532 in the second configuration can contract, thereby applying a force on each of the hinge assemblies 520. As a result, the hinge assemblies 520 are drawn toward each other in the direction of the first dimension 140.

As the hinge assemblies 520 move toward one another, the first attachment member 522 and the second attachment member 524 and their associated arms 541, 543, 545, and 547 can pivot along the respective hinge joints 126 of first hinge assembly 520-1 and second hinge assembly 520-2. By pivoting, the first arms 541, 545 and the second arms 543, 547 can translate the force from the SMM wire 532 to the upper interior surface 514 and the lower interior surface 516, respectively. As such, changes in the size or shape of the outer skin 510 in the second dimension 150 can create an inverse change in size or shape of the outer skin 510 in the first dimension 140. The translated force through the hinge assemblies 520 creates a deformation in the outer skin 510. The deformation of the outer skin 510 causes the actuator 501 to expand along the second dimension 150. The expansion of the actuator 501 along the second dimension 150 results in the actuator 501 having a decreased magnitude along the first dimension 140 and an increased magnitude along the second dimension 150.

Also, during contraction of the SMM wire 132, the compressed spring member(s) 509 exert forces in dimension 150 on first and second actuator sides 510*a*, 510*b* after energization of the SMM wire(s) and during movement of the first and second actuator sides 501*a*, 501*b* along second dimension 150. In particular arrangements, by appropriate selection of spring member and outer skin parameters, the spring member(s) 509 may be configured to aid in moving the first and second actuator sides 501*a*, 501*b* to a degree that enables the use of SMM wire(s) having relatively lower diameters and/or thermal expansion coefficients. The details of suitable spring member characteristics, outer wall material(s) and structures, SMM wire characteristics and other pertinent parameters for a particular actuator application and desired actuator configuration may be determined analytically and/or iteratively through experimentation. Thus, in the manner just described, the forces exerted by the compressed spring member(s) may be configured to act synergistically with the shortening SMM wire(s) in moving the first and second actuator sides 501*a*, 501*b* along dimension 150 when an input is provided to the one or more SMM members.

The spring-loaded arms 541, 543, 545, and 547 shown in FIGS. 5A-6C may act to support portions of the outer skin 510 along substantially an entire width of the actuator 501 between the opposite edges along which the hinge assemblies 520-1 and 520-2 are located. This support may aid in preventing localized deformations of the outer skin as previously described. The arrangement shown in FIGS. 5A-6C also enables the spring members 509 to be positioned at any of a variety of locations between pairs of opposed first and second arms and along the lengths of the arms. Thus, the arrangement provides flexibility regarding the positioning of the springs and the types of springs that may be used.

It is further understood, that the first dimension 140 and the second dimension 150 are two exemplary possibilities of a variety of dimensions of the actuator 100. Thus in one or more implementations, the first dimension 140 and the second dimension 150 as described herein can be any dimensions of the actuator 100 and is not limited by the depicted dimensions of the first dimension 140 and the second dimension 150. Further, the first dimension 140 and the second dimension 150 appear to cross along a central axis X1 of each actuator embodiment. However, the point of intersection between the first dimension 140 and the second dimension 150 is not a necessary attribute of the actuator 100 generally, the first dimension 140, and/or the second dimension 150.

When applied in conjunction with a vehicle seat, the actuator 100 can change dimensions and reconfigure the seat surface to benefit the affected occupant. Through this change in shape, the actuator 100 can help mitigate or dampen forces applied to the occupant while the vehicle is in transit, such as during tight terms or evasive maneuvers. By changing the seat surface, the actuator 100 can help prevent the occupant from being displaced from the vehicle seat. Thus, the actuator 100 can benefit an occupant of a vehicle both in safety and comfortability.

Figure 7:
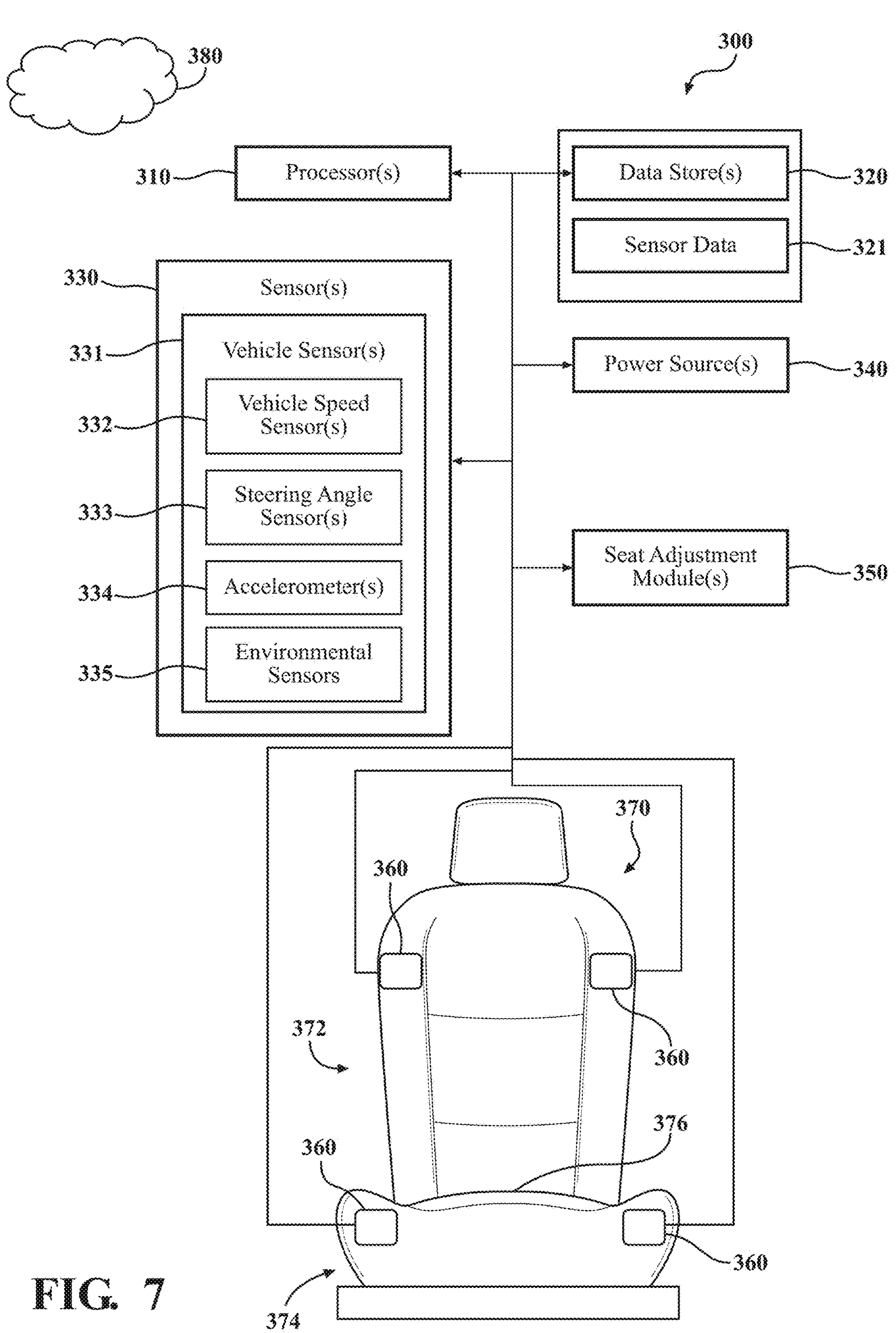
FIG. 7 is a block diagram of the actuator control system, according to some implementations.

FIG. 7 discloses one or more elements of the actuator control system 300, according to one or more implementations. The actuator control system 300 can be part of a vehicle and/or a computing device. The actuator control system 300, and components described herein, can function to adjust a seat in a vehicle in response to expected or actual movement of an occupant within the vehicle based on external stimulus. As used herein, the "vehicle" is any form of motorized transport. In one or more implementations, the vehicle can be an automobile. In some implementations, the vehicle may be any other form of motorized transport that, for example, can operate autonomously, semi-autonomously, or manually by an in-vehicle operator. The computing device can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). In one or more implementations, the actuator control system 300 or components therein can be distributed among a plurality of devices to perform the functions described herein. As such, the actuator control system 300 is described herein with relation to components in a device-agnostic fashion.

The actuator control system 300 can detect conditions in which a vehicle occupant experiences or will experience lateral acceleration. In some instances, the actuator control system 300 can detect change in position or location of the vehicle which is sudden or drastic enough that the force applied to the occupant changes the occupant position with respect to the vehicle seat. Once detected, the actuator control system 300 can control the seat surface of the vehicle seat to prevent or stop the changes in the occupant position.

The actuator control system 300 can further include one or more processor(s) 310 for use in the data processing and analysis described herein. The processor(s) 310, which can also be referred to as a central processing unit (CPU), can be one or more devices which are capable of receiving and executing one or more instructions to perform a task as part of a computing device. In one implementation, the processor(s) 310 can include a microprocessor such as an application-specific instruction set processor (ASIP), a graphics processing unit (GPU), a physics processing unit (PPU), a DSP, an image processor, a co-processor, or others.

The actuator control system 300 can further comprise memory, such as data store(s) 320. The data store(s) 320 can include volatile and/or non-volatile memory. Examples of suitable data store(s) 320 include RAM, flash memory, ROM, EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operably connected to the processor(s) 310 for use thereby. The data store(s) 320 can include one or more modules that include computer-readable instructions that, when executed by the processor 310, cause the processor 310 to perform methods and functions that are discussed herein. The data store(s) 320 can include one or more databases or portions thereof.

As noted above, the actuator control system 300 can include the sensor(s) 330. "Sensor" means any device, component and/or system that can detect, and/or sense something. The one or more sensors can be configured to detect, and/or sense in real-time. In arrangements in which the sensor(s) 330 includes a plurality of sensors, the sensors can function independently from each other. Alternatively, two or more of the sensors can work in combination with each other. In such a case, the two or more sensors can form a sensor network. The sensor(s) 330 and/or the one or more sensors can be operably connected to the processor(s) 310, the data store(s) 320, and/or another element of the actuator control system 300.

The sensor(s) 330 can include any suitable type of sensor. Various examples of different types of sensors will be described herein. However, it will be understood that the implementations are not limited to the particular sensors described. The sensor(s) 330 can include one or more vehicle sensor(s) 331. The vehicle sensor(s) 331 can detect, determine, and/or sense information about the actuator control system 300 itself. In one or more arrangements, the vehicle sensor(s) 331 can be configured to detect, and/or sense position and orientation changes of the actuator control system 300, such as, for example, based on inertial acceleration. In one or more arrangements, the vehicle sensor(s) 331 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 331 can be configured to detect, and/or sense one or more characteristics of the actuator control system 300 or the environment surrounding the actuator control system 300. In one or more arrangements, the vehicle sensor(s) 331 can include a vehicle speed sensor(s) 332 to determine a current speed of the actuator control system 300 (e.g., a speedometer), steering angle sensor(s) 333, one or more accelerometer(s) 334, or combinations thereof.

Alternatively, or in addition, the sensor(s) 330 can include one or more environment sensor(s) 335 configured to acquire, and/or sense driving environment data. "Driving environment data" includes any data or information about the external environment in which an autonomous vehicle is located or one or more portions thereof. For example, the one or more environment sensor(s) 335 can be configured to detect, quantify and/or sense objects in at least a portion of the external environment of the actuator control system 300, such as to determine position and changes therein. The one or more environment sensor(s) 335 can be configured to detect, measure, quantify and/or sense other things in the external environment of the actuator control system 300, such as, for example, lane markers, signs, traffic lights, traffic signs, lane lines, crosswalks, curbs proximate the actuator control system 300 or components thereof, off-road objects, etc. As an example, in one or more arrangements, the environment sensor(s) 335 can include one or more radar sensors, one or more LIDAR sensors, one or more sonar sensors, and/or one or more cameras.

Various examples of sensors of the sensor(s) 330 will be described herein. The example sensors may be part of the one or more environment sensor(s) 335 and/or the one or more vehicle sensor(s) 331. Moreover, the sensor(s) 330 can include occupant sensors that function to track or otherwise monitor aspects related to the an occupant of a vehicle. However, it will be understood that the implementations are not limited to the particular sensors described.

The one or more data store(s) 320 can include sensor data 321. In one or more implementations, the sensor data 321 can be collected from and/or produced by the sensor(s) 330. In this context, "sensor data" means any information about the sensors that the actuator control system 300 is equipped with, including the capabilities and other information about such sensors. As will be explained below, the actuator control system 300 can include the sensor(s) 330. The sensor data 321 can relate to one or more sensors of the sensor(s) 330.

The actuator control system 300 can include one or more power sources 340. The power source(s) 340 can be any power source capable of and/or configured to energize the seat actuator described herein. For example, the power source(s) 340 can include one or more batteries, one or more fuel cells, one or more generators, one or more alternators, one or more solar cells, and combinations thereof.

The actuator control system 300 can further include the vehicle seat 370. The vehicle seat 370 is representative of one or more seats found in a vehicle. The vehicle seat 370 can include a seat back 372 and a seat cushion 374. The vehicle seat 370 can further include a seat surface 376. One or more actuators 360 can be positioned under the seat surface 376 shown here with two (2) actuators 360 positioned inside of the seat back 372 and two (2) actuators 360 positioned inside of the seat cushion 374. The actuators 360 positioned and oriented such that actuation of the actuators 360 can change the shape of the seat surface 376, as received by an occupant. Though total of four (4) actuators 360 are shown integrated into the vehicle seat 370, it is understood that more or fewer actuators 360 can be used for one or more implementations described herein. The actuators 360 can be substantially similar to and/or incorporate components of any of the actuator embodiments previously described herein.

The actuator control system 300 can further include the seat adjustment module(s) 350. The seat adjustment module(s) 350 can include one or more modules capable of and/or configured to adjust the vehicle seat, according to one or more implementations described herein. The seat adjustment module(s) 350 can include instructions that function to control the processor(s) 310 to receive the sensor data 321 from the one or more sensor(s) 330 of the vehicle. In one or more implementations, the seat adjustment module(s) 350 can receive the sensor data 321 from the sensor(s) 330 in a passive fashion (e.g., receiving sensor data without specific request or control) or an active fashion (e.g., receiving sensor data in response to one or more inputs). In some implementations, the seat adjustment module(s) 350 through instructions to the processor(s) 310 requests one or more components of the sensor data 321 from the sensor(s) 330. In further implementations, the seat adjustment module(s) 350 through instructions to the processor(s) 310, receive some or all of the sensor data 321 as produced by the sensor(s) 330.

In some implementations, the seat adjustment module(s) 350 can further include instructions to collect data or receive data selectively based on sensor type. The seat adjustment module(s) 350 can, through instructions to the processor(s) 310, selectively receive or collect sensor data 321 from one or more components of the sensor(s) 330, such as from sensors that are specifically on the vehicle (e.g., the vehicle sensor(s) 331). It is understood that information about momentum, velocity, acceleration, and other facets of vehicle movement can be used beneficially to determine the effects of vehicle movement on an occupant. As such, the seat adjustment module(s) 350 can request information or receive information from the vehicle speed sensor(s) 332, the steering angle sensor(s) 333, the accelerometer(s) 334, or combinations thereof. The seat adjustment module(s) 350 can further reference information against the environmental sensor(s) 335, such that the seat adjustment module(s) 350 can make a spatial determination of vehicle location, movement, acceleration, traction, and other aspects of vehicle interaction in a three-dimensional space.

In further implementations, the seat adjustment module(s) 350 can further include instructions to incorporate sensor data from one or more remote sources. The seat adjustment module(s) 350 can include instructions to receive or gather data from locally available sensor(s) 330 (e.g., the vehicle sensor(s) 331), such as sensor(s) 330 available to one or more computing devices, as well as internally directed vehicle sensor(s) 331 and externally directed vehicle sensor(s) 331. The seat adjustment module(s) 350 can receive the sensor data 321 from the sensor(s) 330 through a network 380. The network 380 can include any type of electronic device communications, including a local area network (LAN) or a wide area network (WAN), a controller area network (CAN) bus, mesh network, ad-hoc networks, or any other connection involving a second or a remote computing device (for example, through the Internet using an Internet Service Provider).

The sensor(s) 330 can be sensors connected to or otherwise available from external sources, such as other vehicles, infrastructure, nontraditional sensors, or others which can be used to make determinations about vehicle movements and the effects on occupants within the vehicle. Vehicle sensor(s) 331 which are internally directed can include image capture devices (e.g., cameras), audio capture devices (e.g., microphones), pressure or weight sensors, and others that capture information from or about the cabin of the vehicle. Once the sensor data 321 is received, the seat adjustment module(s) 350 can provide instructions to store the sensor data 321 in the data store(s) 320.

The seat adjustment module(s) 350 can further include instructions that function to control of the processor(s) 310 to determine, using the sensor data, whether an actuator activation threshold is met. The actuator activation threshold, as used herein, relates one or more minimum or maximum data points which indicate that the activation of one or more of the actuators 360 is appropriate. The seat adjustment module(s) 350 can include instructions to make a determination of the actuator activation threshold for one or more occupants. The actuator activation threshold can include a specific level of acceleration or a specific change in acceleration, the directionality of the acceleration, the force applied in braking (e.g., deceleration), or other factors which can affect or have an impact on occupant position within the vehicle. In one or more implementations, the actuator activation threshold can be a range of numbers, where the range can set of lower boundary, an upper boundary, or both.

In some implementations, the seat adjustment module(s) 350 can select an actuator activation threshold based on one or more pre-established values. In this implementation, the seat adjustment module(s) 350 can reference the data store(s) 320, through instructions to the processor(s) 310, and select from one or more values that are stored therein. In further implementations, the seat adjustment module(s) 350 can include instructions to calculate or otherwise determine the actuator activation threshold. The seat adjustment module(s) 350 can include instructions to collect threshold information, including ambient environmental conditions, vehicle conditions, and/or characteristics about the occupants. The seat adjustment module(s) 350 can, through instructions to the processor(s) 310, prepare or create one or more actuator activation thresholds using the threshold information.

Further, the actuator activation threshold can take into account personal characteristics of the occupant, such as age, height, weight, infirmity, or other factors individual to the occupant. The seat adjustment module(s) 350 can include instructions to request or determined personal characteristics of the occupant. The seat adjustment module(s) 350 can, through instructions to the processor(s) 310, select a pre-established or calculated range based on the personal characteristics. In further implementations, the seat adjustment module(s) 350 can include instructions to the processor(s) 310 two incorporate personal characteristics of the occupant in the threshold information described above. The seat adjustment module(s) 350, through the processor(s) 310, can prepare or create one or more actuator activation thresholds using the threshold information including the personal characteristics.

The seat adjustment module(s) 350 can include instructions to apply the actuator activation thresholds to the sensor data 321 to determine if the threshold has been met. In some implementations, the seat adjustment module(s) 350 compares given values or data points to the actuator activation threshold to determine if the threshold has been met. In further implementations, the seat adjustment module(s) 350, through instructions to the processor(s) 310, calculates or processes the given values data points to determine if the actuator activation threshold has been met. Here the seat adjustment module(s) 350, after receiving the sensor data 321, can transform these data points based on characteristics of the data, such as a Fourier transform, integrals, derivations, associations with physical properties, or others.

The seat adjustment module(s) 350 can further include instructions to control processor(s) 310 to cause an activation input to be provided to the SMM wire of at least one of the one or more actuators to morph the seat surface in response to determining that the actuator activation threshold is met. The activation input can be a direct input, such as delivering heat or electrical input directly to the SMM wire, or an indirect input. Indirect input, as used herein, relates to input which is delivered to the SMM wire by a secondary mechanism, such as by delivering instructions to a secondary device, wherein the secondary device delivers heat or electrical input to the SMM wire. The vehicle can include one or more power sources. The power source(s) can be any power source capable of and/or configured to energize the SMM wire. For example, the power source(s) can include one or more batteries, one or more fuel cells, one or more generators, one or more alternators, one or more solar cells, and combinations thereof.

In further implementations, the seat adjustment module(s) 350 can further include instructions to calculate or otherwise determine an appropriate response based on the data points. The seat adjustment module(s) 350 can, through instructions to the processor(s) 310, determine one or more parameters of the forces applied on the occupant by the vehicle, including lateral forces, gravitational forces, and others which may affect occupant displacement. The seat adjustment module(s) 350 can select one or more of the actuators 360 to activate such that the occupant displacement is mitigated, in whole or in part. The actuators 360 can be actuated as described above with reference to FIGS. 1A-6C, creating a displacement at one or more locations in the seat surface 376. The change in shape of the seat surface 376 can create a physical barrier or another form of resistance (e.g., friction) to the occupant displacement.

The seat adjustment module(s) 350 can thus use the changes in position and location of the vehicle to determine the effects on the displacement of the occupant. Using the anticipated or detected occupant displacement, the seat adjustment module(s) 350 can respond by actuating one or more actuators to change the shape of the seat surface, such as the seat bolsters. The change in shape can be specifically selected to prevent the occupant displacement. Thus, the seat adjustment module(s) 350 can reduce or prevent occupant displacement in the vehicle, creating a more comfortable commute for the occupant, reducing the likelihood of injury and helping the operator maintain control of the vehicle during difficult driving conditions.

Figure 8A:
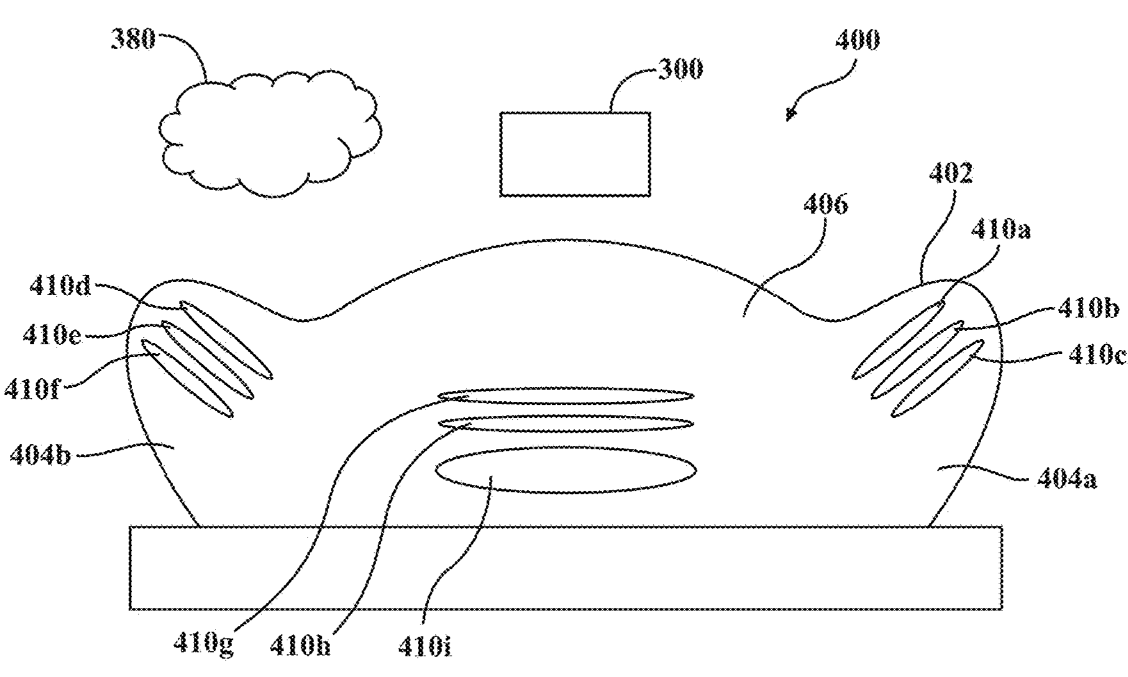
FIGS. 8A and 8B are illustrations of one or more actuators as part of the seat assembly for vehicle, according to some implementations.
Figure 8B:
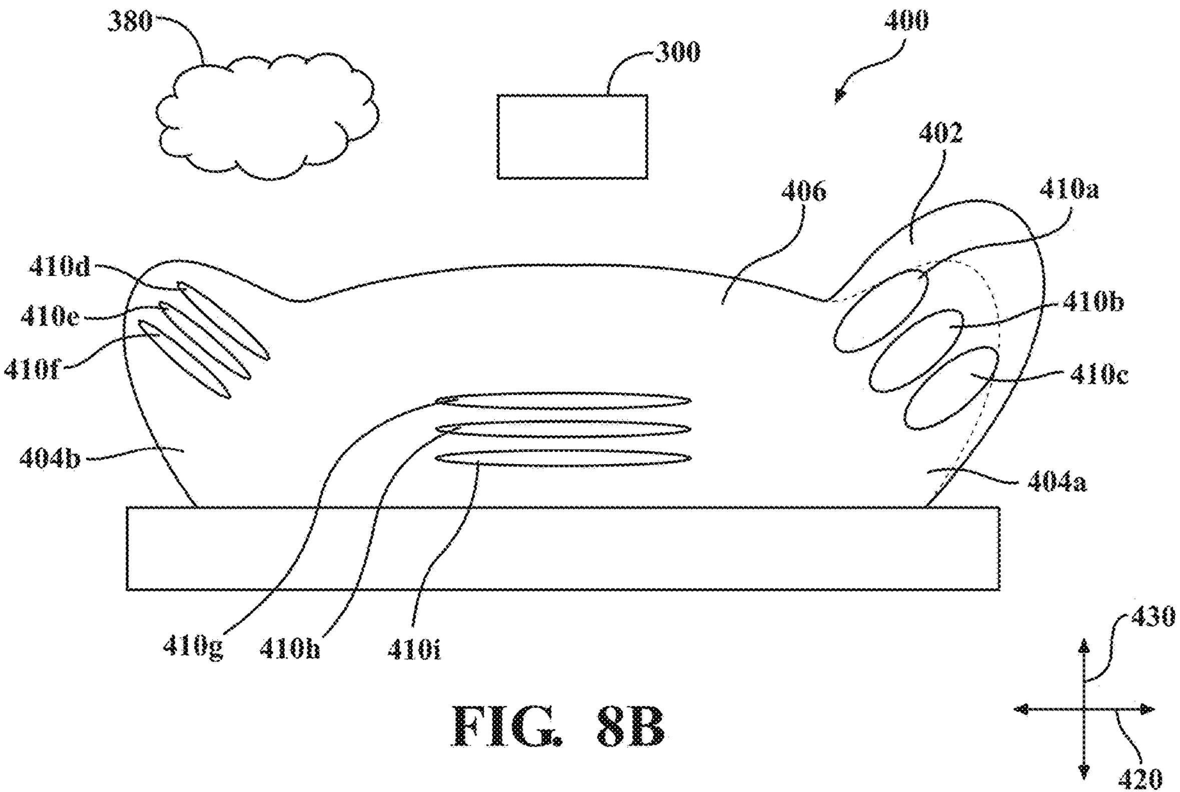

FIGS. 8A and 8B depict a portion of a responsive vehicle seat 400 for use in a vehicle, according to one or more implementations described herein. FIG. 8A depicts the vehicle seat 400 in a passive configuration, according to one or more implementations. The vehicle seat 400 can include a seat surface 402 having a seat bolster 404*a*, a seat bolster 404*b*, and a seat center 406. The vehicle seat 400 can further include one or more actuator 410, such as a actuator 410*a*-410*i* positioned within the vehicle seat 400 under a seat surface 402. The vehicle seat 400 can actuate one or more of the actuator 410*a*-410*i* to change the shape and/or the configuration of the seat surface 402, as disclosed herein.

The vehicle seat 400 is depicted here showing the lower portion of the seat, including the seat center 406 and the seat bolster 404*a* and 404*b*. The one or more actuators 410 or positioned in one or more locations in the vehicle seat 400, shown here with the actuator 410*a*-410*c* positioned within the seat bolster 404*a*, the actuator 410*d*-410*f* positioned within the seat bolster 404*b*, and the actuator 410*g*-410*i* positioned within the seat center 406. The actuator 410*a*-410*i* can be substantially similar to the actuator 100, described with reference to FIG. 1A-1C.

In one example of the system in operation, the actuator control system 300 can detect, predict, or otherwise determine that a lateral acceleration is currently being applied or will be applied to one or more occupants in the vehicle. The actuator control system 300 can send one or more inputs to the actuator 410*a*-410*i* to change the seat surface 402 such that the shift of the occupant in response to the lateral acceleration is mitigated. The actuator control system 300 can determine which of the actuator 410*a*-410*i* should be actuated in response to the lateral acceleration as detected by the actuator control system 300. In one or more implementations, the actuator control system 300 can be operatively connected with the vehicle seat 400 through the network 380, such as being in direct or indirect communication with the vehicle seat 400. As such, the actuator control system 300 can directly or indirectly send an input to the actuator 410*a*-410*i* to control transition between the passive and activated configurations as described above.

The actuation of some of the actuator 410*a*-410*i* within the vehicle seat 400 is depicted in FIG. 8B. The actuator control system 300 can transmit a signal to the actuator 410*a*, 410*b*, and 410*c* to transition from the passive configuration to the activated configuration. In one or more implementations, the actuator 410*a*, 410*b*, and 410*c* can actuate a seat bolster, a seat center, a seat back, or other surfaces or features of a vehicle seat. Each of the actuator 410*a*, 410*b*, 410*c*, directly or indirectly receive an input, such as thermal or electrical input, which causes the SMM wire to reverting to a first configuration. The first shape applies a force to the first dimension of the actuator 410*a*, 410*b*, 410*c*, which causes a decrease in the first dimension 420 and an increase in the second dimension 430.

The respective decreases and increases are translated to the seat surface 402 of bolster 404*a* to create resistance to the lateral acceleration, thus allowing the occupant to remain in the vehicle seat. As shown here, the seat bolster 404*a* expands in the second dimension 430 in response to the actuator 410*a*-410*c* expanding in the second dimension 430. In this example, the lateral acceleration from the perspective of the occupant can be detected as moving in the direction of the seat bolster 404*a*. By changing the shape of the seat bolster 404*a*, the actuator control system 300 to create a physical barrier to the lateral shift of the occupant in the vehicle seat 400.

In some instances, there can be actuators positioned relative to other portions of the seat 400, such as in the seat center 406, to further the support provided. For instance, actuators in the seat center 406 can be configured to contract in the second dimension 430 in response to receiving an input. As a result, the seat center 406 can contract in the second dimension 430 in response to the actuator 410*i* contracting in the second dimension 430. As a result, the barrier imposed by the enlarged bolster 404*a* can become more pronounced.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 9:
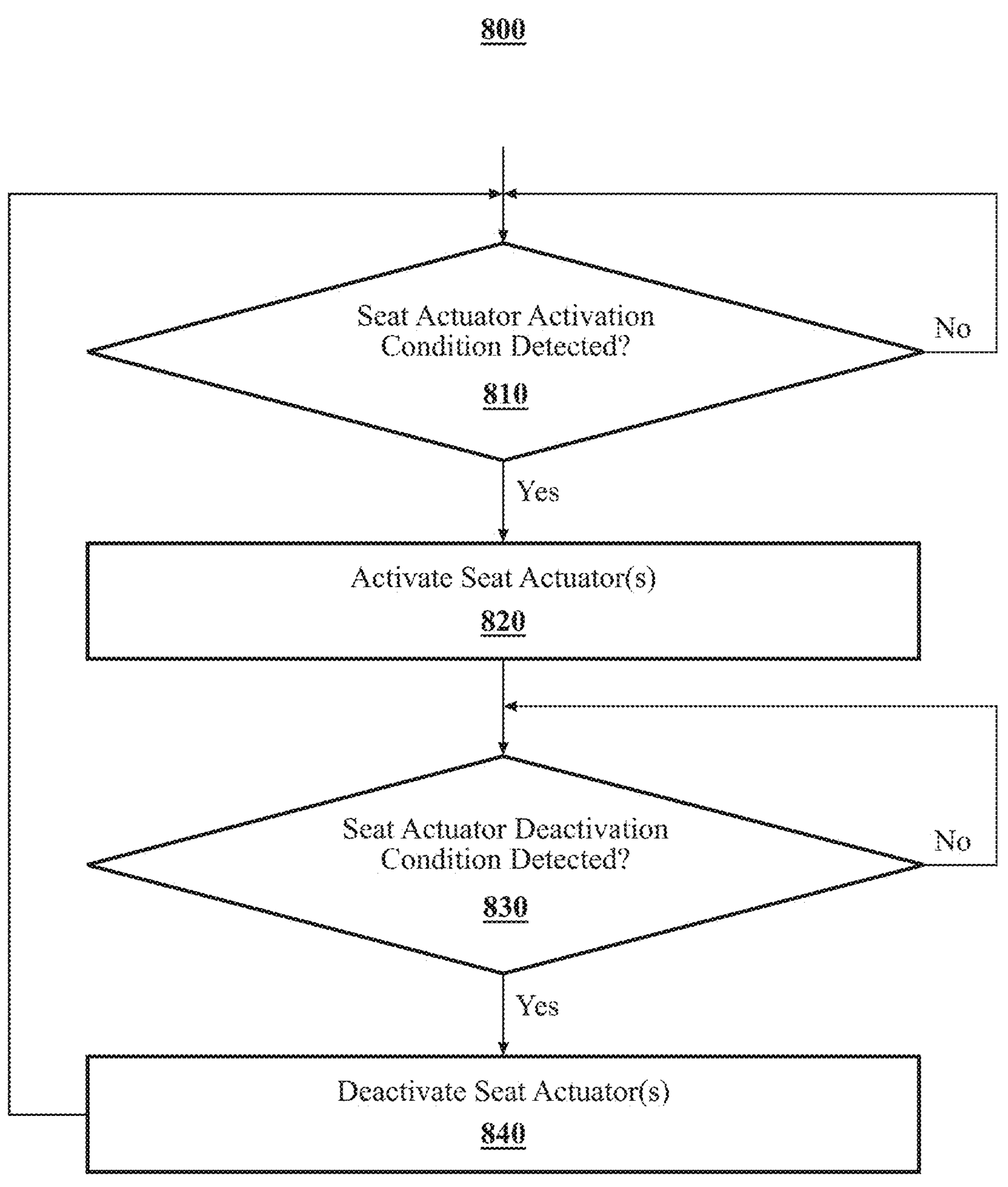
FIG. 9 is an example of a method of selectively morphing a portion of a vehicle seat.

Turning to FIG. 9, an example of a method 800 is shown. For the sake of discussion, the method 800 can begin with the actuator 100 in a non-activated mode, such as is shown in FIG. 3A. In the non-activated mode, electrical energy from the power source(s) 340 is not supplied to the actuator 100. At block 810, it can be determined whether a seat activation condition has been detected. The seat activation condition may be detected by the seat adjustment module(s) 350, the processor(s) 310, and/or one or more sensor(s) 330. For instance, the seat adjustment module(s) 350, the processor(s) 310, and/or one or more sensor(s) 330 can determine that data acquired by the vehicle sensor(s) 331 meets a seat activation condition.

In some implementations, the seat adjustment module(s) 350, the processor(s) 310, and/or one or more sensor(s) 330 can determine whether the current vehicle speed and/or the current steering angle meet respective seat activation threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. Alternatively or additionally, the seat adjustment module(s) 350, the processor(s) 310, and/or one or more sensor(s) 330 can determine whether the current lateral acceleration meets respective seat activation threshold. Alternatively or in addition, the seat adjustment module(s) 350, the processor(s) 310, and/or one or more sensor(s) 330 can detect a user input indicating that the interface should be activated. The user input can be provided via an input interface.

If a seat activation condition is not detected, the method 800 can end, return to block 810, or proceed to some other block. However, if a seat activation condition is detected, then the method can proceed to block 820. At block 820, the actuator 100 can be activated. Of course, the seat adjustment module(s) 350 and/or the processor(s) 310 may only actuate certain individual actuator 100 while leaving others in a non-activated state. Thus, the seat adjustment module(s) 350 and/or the processor(s) 310 can cause or allow the flow of electrical energy from the power sources(s) 340 to the actuator 100. Current flowing through the input-responsive element 130 can cause the input-responsive element 130 to heat up which causes them to change, which, consequently, causes the actuator 100 to morph into an activated configuration.

When activated, the actuator 100 can morph to an activated shape, such as is shown in FIG. 3C. The actuator 100 can interact with portions of the vehicle seat 370 to cause a portion of the vehicle seat 370 to morph into an activated configuration, such as is shown in FIG. 8B. The method can continue to block 830.

At block 830, it can be determined whether a seat deactivation condition has been detected. The seat deactivation condition may be detected by the seat adjustment module(s) 350, such as based on data acquired by the sensor(s) 330 and/or by detecting a user input or the cessation of a user input. If a seat deactivation condition is not detected, the method 800 can return to block 830, or proceed to some other block. However, if a deactivation condition is detected, then the method can proceed to block 840. At block 840, the actuator 100 can be deactivated. Thus, the seat adjustment module(s) 350 and/or the processor(s) 310 can cause the flow of electrical energy from the power sources(s) 340 to the actuator 100 to be discontinued.

The method 800 can end. Alternatively, the method 800 can return to block 810 or some other block.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1A-9, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the preceding. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the preceding. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the arrangements described herein may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An actuator comprising:

a first hinge assembly and a second hinge assembly separate from the first hinge assembly;

an outer skin defining a first actuator side and a second actuator side residing opposite the first actuator side, the outer skin defining a cavity, the outer skin being operatively connected to the first and second hinge assemblies so that movement of each one of the hinge assemblies in a direction toward the other one of the hinge assemblies produces forces on the first and second actuator sides tending to urge the first and second actuator sides away from each other;

one or more shape-memory material (SMM) members operatively connected to, and extending between, the first and second hinge assemblies and configured to urge the hinge assemblies toward each other responsive to an activation input provided to the one or more SMM members; and at least one spring member positioned within the cavity and structured to exert forces on the first and second actuator sides tending to urge the first and second actuator sides away from each other.

2. The actuator of claim 1 including at least two spring members positioned within the cavity, each of the spring members being structured to exert forces on the first actuator side and second actuator side tending to urge the first actuator side and second actuator side away from each other, wherein the actuator further comprises a load distribution member positioned between the outer skin and the spring members, the at least two spring members and one of the first actuator side and second actuator side, the load distribution member also extending from a first spring member of the at least two spring members to a second spring member of the at least two spring members.

3. The actuator of claim 2 further comprising another load distribution member positioned between the at least two spring members and another one of the first actuator side and second actuator side, the other load distribution member also extending from a first spring member of the at least two spring members to a second spring member of the at least two spring members.

4. The actuator of claim 1, wherein the one or more SMM wires includes a single SMM wire arranged in an alternating pattern extending between the first hinge assembly and the second hinge assembly.

5. The actuator of claim 1, wherein the actuator is further configured such that, when an activation input to the one or more SMM wires is discontinued, the one or more SMM wires substantially return to a passive configuration.

6. The actuator of claim 1, wherein each of the first and second hinge assemblies comprises a first attachment member and a second attachment member connected by a hinge joint and directly connected to the outer skin, the first attachment member rotating with relation to the second attachment member about the hinge joint.

7. The actuator of claim 6 further comprising at least one first arm extending from the first hinge assembly first attachment member and at least one second arm extending from the first hinge assembly second attachment member so as to reside directly opposite an associated first arm extending from the first hinge assembly first attachment member, wherein at least one spring member is positioned between the at least one first hinge assembly first attachment member first arm and the at least one first hinge assembly second attachment member second arm so as to exert forces on the at least one first hinge assembly first attachment member first arm and the at least one first hinge assembly second attachment member second arm urging the at least one first hinge assembly first attachment member first arm and the at least one first hinge assembly second attachment member second arm away from each other.

8. The actuator of claim 7 wherein the at least one first arm is structured to exert a first force on the first actuator side and the at least one second arm is structured to exert a second force on the second actuator side such that the first and second forces operate to urge the first actuator side and the second actuator side away from each other.

9. The actuator of claim 6 further comprising at least one first arm extending from the second hinge assembly first attachment member and at least one second arm extending from the second hinge assembly second attachment member so as to reside directly opposite an associated first arm extending from the second hinge assembly first attachment member, wherein at least one spring member is positioned between the at least one second hinge assembly first attachment member first arm and the at least one second hinge assembly second attachment member second arm so as to exert forces on the at least one second hinge assembly first attachment member first arm and the at least one second hinge assembly second attachment member second arm urging the at least one second hinge assembly first attachment member first arm and the at least one second hinge assembly second attachment member second arm away from each other.

10. The actuator of claim 9 wherein the at least one second hinge assembly first attachment member first arm and the at least one first hinge assembly first attachment member first arm are spaced apart from each other and combine to support the first actuator side.

11. The actuator of claim 9 wherein the at least one first hinge assembly second attachment member second arm and the at least one second hinge assembly second attachment member second arm are spaced apart from each other and combine to support the first actuator side.

12. A system for active vehicle seat adjustment, comprising:

a vehicle seat, the vehicle seat including a seat surface;

one or more actuators located within a portion of the vehicle seat, the one or more actuators being operatively positioned relative to the seat surface such that, when activated, the one or more actuators cause the seat surface to morph into an activated configuration, each of the actuators having:

a first hinge assembly and a second hinge assembly separate from the first hinge assembly;

an outer skin defining a first actuator side and a second actuator side residing opposite the first actuator side, the outer skin defining a cavity, the outer skin being operatively connected to the first and second hinge assemblies so that movement of each one of the hinge assemblies in a direction toward the other one of the hinge assemblies produces forces on the first and second actuator sides tending to urge the first and second actuator sides away from each other;

one or more shape-memory material (SMM) members operatively connected to, and extending between, the first and second hinge assemblies and configured to urge the hinge assemblies toward each other responsive to an activation input provided to the one or more SMM members; and at least one spring member positioned within the cavity and structured to exert forces on the first and second actuator sides tending to urge the first and second actuator sides away from each other.

13. The system of claim 12, further including:

one or more processors operatively connected to the one or more actuators; and a memory communicably coupled to the one or more processors and storing instructions that when executed by the one or more processors cause the one or more processors to:

receive sensor data from one or more sensors on a vehicle;

determine, using the sensor data, whether an actuator activation threshold is met; and responsive to determining that the actuator activation threshold is met, cause an activation input to be provided to the SMM member of at least one of the one or more actuators, the at least one of the one or more actuators morphing the seat surface in response to the activation input.

14. The system of claim 12, wherein at least one of the one or more actuators is configured to actuate a seat back, a bolster of a seat back, a seat cushion, or a bolster of a seat cushion of the vehicle seat.

15. The system of claim 12, wherein the sensor data used to determine whether an actuator threshold has been met includes vehicle speed or steering wheel angle.

16. The system of claim 12, wherein the sensor data used to determine whether an actuator threshold has been met includes lateral acceleration.

17. The system of claim 12, wherein the one or more actuators are further configured such that, when an activation input to the SMM member is discontinued, the SMM member substantially returns to a passive configuration.

18. A method of morphing a portion of a vehicle seat, one or more actuators being located within the vehicle seat, the one or more actuators being operatively positioned such that, when activated, the one or more actuators cause a portion of the vehicle seat to morph into an activated configuration, the method comprising:

receiving sensor data from one or more sensors on a vehicle;

determining, based on the sensor data, whether a seat actuator activation condition is met; and responsive to determining that the seat actuator activation condition is met, causing one or more actuators to be activated to cause a portion of the vehicle seat to morph into an activated configuration, the one or more actuators including:

a first hinge assembly and a second hinge assembly separate from the first hinge assembly;

an outer skin defining a first actuator side and a second actuator side residing opposite the first actuator side, the outer skin defining a cavity, the outer skin being operatively connected to the first and second hinge assemblies so that movement of each one of the hinge assemblies in a direction toward the other one of the hinge assemblies produces forces on the first and second actuator sides tending to urge the first and second actuator sides away from each other;

one or more shape-memory material (SMM) members operatively connected to, and extending between, the first and second hinge assemblies and configured to urge the hinge assemblies toward each other responsive to an activation input provided to the one or more SMM members; and at least one spring member positioned within the cavity and structured to exert forces on the first and second actuator sides tending to urge the first and second actuator sides away from each other.

19. The method of claim 18, wherein the portion of the vehicle seat is a seat cushion, a bolster of a seat cushion, a seat back, or a bolster of a seat back.

20. The method of claim 18, wherein determining, based on the sensor data, whether a seat actuator activation condition is met includes:

comparing the sensor data to one or more thresholds, wherein the one or more thresholds includes a vehicle speed threshold, a steering angle threshold, or a lateral acceleration threshold; and if the sensor data meets the one or more thresholds, then it is determined that a seat actuator activation condition is detected.

21. The actuator of claim 1, wherein the one or more shape-memory material (SMM) members are directly connected to the first hinge assembly and to the second hinge assembly.

22. The actuator of claim 1, wherein the one or more shape-memory material (SMM) members extend from the first hinge assembly to the second hinge assembly and from the second hinge assembly to the first hinge assembly.

* * * * *